United States Patent
Li et al.

(10) Patent No.: US 12,407,446 B2
(45) Date of Patent: Sep. 2, 2025

(54) SIGNAL PROCESSING METHOD AND APPARATUS, FIRST COMMUNICATION NODE, SECOND COMMUNICATION NODE, AND STORAGE MEDIUM

(71) Applicant: ZTE CORPORATION, Shenzhen (CN)

(72) Inventors: Weimin Li, Shenzhen (CN); Zhifeng Yuan, Shenzhen (CN); Zhigang Li, Shenzhen (CN); Yihua Ma, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 449 days.

(21) Appl. No.: 17/792,992

(22) PCT Filed: Dec. 30, 2020

(86) PCT No.: PCT/CN2020/141212
§ 371 (c)(1),
(2) Date: Jul. 14, 2022

(87) PCT Pub. No.: WO2021/143529
PCT Pub. Date: Jul. 22, 2021

(65) Prior Publication Data
US 2023/0063566 A1    Mar. 2, 2023

(30) Foreign Application Priority Data
Jan. 16, 2020    (CN) .......................... 202010049572.4

(51) Int. Cl.
*H04W 74/0833*    (2024.01)
*H04J 13/00*    (2011.01)
(Continued)

(52) U.S. Cl.
CPC ........ *H04L 1/0083* (2013.01); *H04J 13/0062* (2013.01); *H04L 5/0007* (2013.01);
(Continued)

(58) Field of Classification Search
None
See application file for complete search history.

(56) References Cited

U.S. PATENT DOCUMENTS

2005/0195763 A1 *    9/2005    Kadous ............... H04L 25/0226
                                                            370/328
2008/0291945 A1 *    11/2008    Luo ...................... H04J 11/0069
                                                            370/509
(Continued)

FOREIGN PATENT DOCUMENTS

CN    1171662 A    1/1998
CN    1951077 A    4/2007
(Continued)

OTHER PUBLICATIONS

International Search Report for Application No. PCT/CN2020/141212, dated Mar. 10, 2021, 4 pages including English translation.
(Continued)

*Primary Examiner* — Anh Vu H Ly
(74) *Attorney, Agent, or Firm* — Morgan, Lewis & Bockius LLP

(57) ABSTRACT

Provided are a signal processing method and apparatus, a first communication node, a second communication node, and a storage medium. The signal processing method includes acquiring N first sequences, combining the N first sequences to obtain a second sequence, and generating a signal according to the second sequence. N is an integer greater than or equal to 2.

18 Claims, 10 Drawing Sheets

(51) Int. Cl.
  *H04L 1/00* (2006.01)
  *H04L 5/00* (2006.01)
  *H04L 27/26* (2006.01)

(52) U.S. Cl.
  CPC .......... *H04L 5/0016* (2013.01); *H04L 5/0051* (2013.01); *H04L 27/2613* (2013.01); *H04W 74/085* (2013.01)

(56) References Cited

U.S. PATENT DOCUMENTS

| | | | |
|---|---|---|---|
| 2010/0027486 A1* | 2/2010 | Gorokhov | H04B 1/7075 370/329 |
| 2011/0249548 A1* | 10/2011 | Gaal | H04J 13/0059 375/260 |
| 2018/0062884 A1 | 3/2018 | Li et al. | |
| 2018/0337760 A1* | 11/2018 | Wang | H04L 5/0098 |
| 2019/0335450 A1* | 10/2019 | Cheng | H04B 7/12 |
| 2019/0372733 A1 | 12/2019 | Wu et al. | |
| 2021/0289546 A1* | 9/2021 | Lee | H04W 74/08 |

FOREIGN PATENT DOCUMENTS

| | | |
|---|---|---|
| CN | 101064528 A | 10/2007 |
| CN | 101682361 A | 3/2010 |
| CN | 106161299 A | 11/2016 |
| CN | 107615726 A | 1/2018 |
| CN | 111901082 A | 11/2020 |
| CN | 111901891 A | 11/2020 |
| WO | WO-2007126280 A2 | 11/2007 |
| WO | 2019179268 A1 | 9/2019 |

OTHER PUBLICATIONS

Extended European Search Report for Application No. 20914086.2, dated Jan. 25, 2024, 12 pages.
First Search Report in Chinese Application No. 202010049572.4, dated Jan. 2, 2025, 8 pages, including translation.
First Office Action in Chinese Application No. 202010049572.4, dated Jan. 8, 2025, 15 pages, including translation.
First Office Action in Korean Application No. 10-2022-7028016, dated Jan. 16, 2025, 11 pages, including translation.
ZTE. "Summary of AI 7.2.1.3 on procedures for NOMA". 3GPP TSG RAN WG1 Meeting #95, R1-1813964, Spokane, USA, Nov. 12-16, 2018.

* cited by examiner

One pilot

W independent pilots

SIGNAL PROCESSING METHOD AND APPARATUS, FIRST COMMUNICATION NODE, SECOND COMMUNICATION NODE, AND STORAGE MEDIUM

CROSS-REFERENCE TO RELATED APPLICATION(S)

This is a national stage application filed under 37 U.S.C. 371 based on International Patent Application No. PCT/CN2020/141212, filed Dec. 30, 2020, which claims priority to Chinese Patent Application No. 202010049572.4 filed with the China National Intellectual Property Administration (CNIPA) on Jan. 16, 2020, the disclosures of which are incorporated herein by reference in their entireties.

TECHNICAL FIELD

The present application relates to the field of communication, for example, a signal processing method and apparatus, a first communication node, a second communication node, and a storage medium.

BACKGROUND

A grant-free transmission terminal may send data autonomously without sending a scheduling request and waiting for dynamic scheduling. Therefore, grant-free transmission may reduce signaling overhead, transmission delay, and terminal power consumption. Additionally, grant-free transmission may also be combined with non-orthogonal transmission to increase the number of access users.

Grant-free transmission includes two solutions, that is, a pre-configured grant-free solution and a contention-based grant-free solution. For pilot-based (with a pilot including, for example, a reference signal or a preamble) contention-based grant-free transmission, the number of pilots is limited. In the case of a relatively large number of access users, pilot collisions are relatively serious, affecting the performance of grant-free transmission.

SUMMARY

The present application provides a signal processing method and apparatus, a first communication node, a second communication node, and a storage medium.

Embodiments of the present application provide a signal processing method. The signal processing method is applied to a first communication node and includes the following.

N first sequences are acquired. The N first sequences are combined to obtain a second sequence. A signal is generated according to the second sequence. N is an integer greater than or equal to 2.

Embodiments of the present application further provide a signal processing method. The signal processing method is applied to a second communication node and includes the following.

A signal is received on a transmission resource, where the signal is generated based on a second sequence. The signal is detected to obtain M sequences for generating the signal. The second sequence is obtained by combining N first sequences, M is an integer greater than or equal to 1, and N is an integer greater than or equal to 2.

Embodiments of the present application further provide a signal processing apparatus. The signal processing apparatus is configured in a first communication node and includes an acquisition module, a combining module, and a generation module.

The acquisition module is configured to acquire N first sequences. The combining module is configured to combine the N first sequences to obtain a second sequence. The generation module is configured to generate a signal according to the second sequence. N is an integer greater than or equal to 2.

Embodiments of the present application further provide a signal processing apparatus. The signal processing apparatus is configured in a second communication node and includes a receiving module and a detection module.

The receiving module is configured to receive a signal on a transmission resource. The signal is generated based on a second sequence. The detection module is configured to detect the signal to obtain M sequences for generating the signal. The second sequence is obtained by combining N first sequences. M is an integer greater than or equal to 1. N is an integer greater than or equal to 2.

Embodiments of the present application further provide a first communication node. The first communication node includes one or more processors and a storage apparatus configured to store one or more programs. When executed by the one or more processors, the one or more programs cause the one or more processors to perform any signal processing method applied to the first communication node according to embodiments of the present application.

Embodiments of the present application further provide a second communication node. The second communication node includes one or more processors and a storage apparatus configured to store one or more programs. When executed by the one or more processors, the one or more programs cause the one or more processors to perform any signal processing method applied to the second communication node according to embodiments of the present application.

Embodiments of the present application further provide a storage medium storing a computer program. When the computer program is executed by a processor, any signal processing method in embodiments of the present application is performed.

DETAILED DESCRIPTION

Embodiments of the present application are described below in conjunction with drawings.

The procedures illustrated in the flowcharts among the drawings may be performed by, for example, a computer system capable of executing a set of computer-executable instructions. Moreover, although logical sequences are illustrated in the flowcharts, in some cases, the illustrated or described procedures may be performed in sequences different from the sequences described herein.

Figure 1:
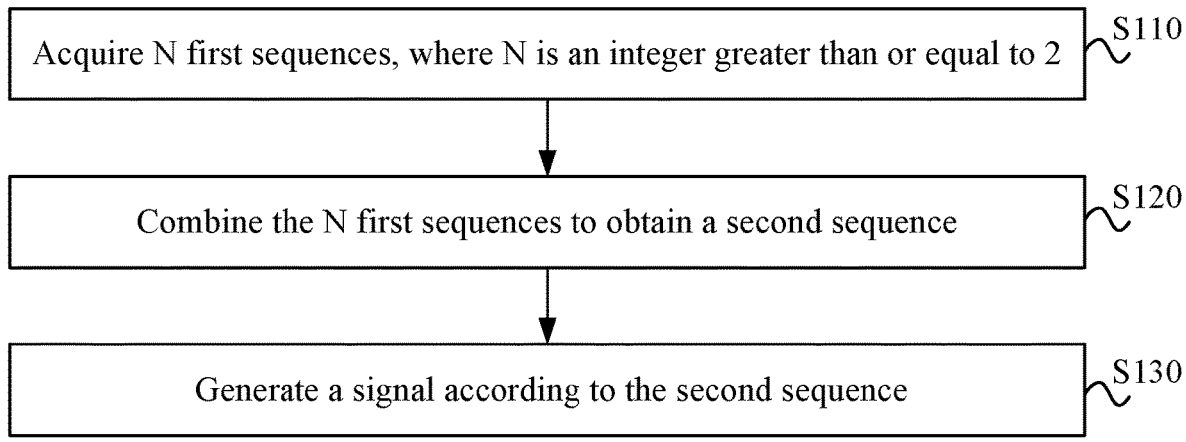
FIG. 1 is a flowchart of a signal processing method according to an embodiment of the present application.

In an exemplary embodiment, FIG. 1 is a flowchart of a signal processing method according to an embodiment of the present application. The method may be performed by a signal processing apparatus provided in the present application. The signal processing apparatus may be implemented by software and/or hardware and may be integrated in a first communication node. The first communication node may be any type of radio user equipment.

In a traditional pilot-based contention-based grant-free transmission solution, the number of pilots is limited. In the case of a relatively large number of access users, pilot collisions are relatively serious, affecting the performance of grant-free transmission. Therefore, an enhanced pilot (including, for example, a reference signal or a preamble) design may be considered, to reduce pilot collisions and thereby improving the performance of contention-based grant-free transmission.

As shown in FIG. 1, the signal processing method provided in the present application includes S110, S120, and S130.

In S110, N first sequences are acquired.

N is an integer greater than or equal to 2.

The first sequences may be acquired from the same sequence set or may be acquired from different sequence sets. Any two sequences among the N first sequences may be different. Alternatively, T sequences among the N first sequences may be the same. T is an integer greater than or equal to 2 and is less than or equal to N.

The first sequences may be acquired randomly.

The value N is not limited here. In an example, the value N includes 2 or 3.

In an example, the length of each of the N first sequences is L. L is an integer greater than or equal to 2.

In S120, the N first sequences are combined to obtain a second sequence.

After the N first sequences are acquired, the N first sequences may be combined to obtain the second sequence in the S120.

The second sequence may be one sequence in a non-orthogonal sequence set.

The means of combining is not limited here. In an example, the means of combining includes, but is not limited to, superimposing processing or a combination in series.

The superimposing processing may be considered as superimposing, that is, adding, the N first sequences. The combination in series includes directly connecting the first sequences in series, that is, connecting the sequences in series. Alternatively, the combination in series includes connecting elements in the first sequences in series in a certain order, that is, connecting the elements in series. For example, in performing the combination in series, a first element in each first sequence is first extracted, then a second element in each first sequence is extracted, and so on, to complete the combination in series.

In S130, a signal is generated according to the second sequence.

After the second sequence is obtained, the second sequence may be processed to generate the signal in the S130. The means of processing is not limited, including but not limited to designated processing and the mapping to a time-frequency resource.

In a grant-free scenario, the signal may be a reference signal. In a random access scenario, the signal may be a random access signal.

After the signal is generated, the signal may also be transmitted on a transmission resource in the present application so that a second communication node receives and detects the signal.

A signal processing method provided in the present application is applied to a first communication node and includes: acquiring N first sequences, combining the N first sequences to obtain a second sequence, and generating a signal according to the second sequence. N is an integer greater than or equal to 2. The method can effectively reduce the probability of pilot collisions and thereby improve the performance of contention-based grant-free transmission.

In an example, a signal processing method provided in the present application may be used for implementing multiple-pilot transmission. According to the method, N first sequences are acquired first. The N first sequences may indicate or correspond to N pilots. Then the N first sequences are combined to obtain a second sequence. A signal is generated according to the second sequence. In this case, code-division multiple-pilot transmission may be implemented. In the method, the use of the N pilots results in a relatively low probability of collisions occurring on all the N pilots. The use of code-division multiple pilots enables each first sequence to be acquired from a relatively large sequence set and have a wider selection range, thereby reducing the probability of collisions occurring on the N pilots.

In an example, a signal processing method provided in the present application may be used for implementing non-orthogonal pilot transmission. According to the method, N first sequences are acquired first. Then the N first sequences are combined to obtain a second sequence. The second sequence corresponds to one pilot. Finally, a signal is generated according to the second sequence. The second sequence may be one sequence in a non-orthogonal sequence set, thereby implementing a non-orthogonal pilot. In the method, the use of the non-orthogonal pilot results in more available pilots, thereby reducing the probability of pilot collisions.

Based on the preceding embodiment, extended embodiments of the preceding embodiment are provided. For the brevity of description, only differences from the preceding embodiment are described in the extended embodiments.

In an embodiment, combining the N first sequences includes the following.

The N first sequences are superimposed. Alternatively, designated processing is performed on the N first sequences separately, and the processed N first sequences are superimposed.

In an embodiment, combining the N first sequences includes the following.

The N first sequences are combined in series. Alternatively, designated processing is performed on the N first sequences separately, and the processed N first sequences are combined in series.

In an embodiment, combining the N first sequences includes the following.

The N first sequences are mapped to different time-frequency resources. Alternatively, designated processing is performed on the N first sequences separately, and the processed N first sequences are mapped to different time-frequency resources.

In an embodiment, generating the signal according to the second sequence includes the following.

Designated processing is performed on the second sequence, the processed second sequence is mapped to a time-frequency resource, and the signal is generated.

In an embodiment, the designated processing includes one or more of the following: mask processing, scrambling processing, precoding processing, energy adjustment, power adjustment, amplitude adjustment, or phase adjustment.

In an embodiment, the second sequence is one sequence in a non-orthogonal sequence set. The second sequence corresponds to one pilot.

In an embodiment, one first sequence corresponds to one pilot.

In an embodiment, acquiring the N first sequences includes one of the following.

The N first sequences are acquired from one sequence set. Any two sequences among the N first sequences are different, or T sequences among the N first sequences are the same. T is an integer greater than or equal to 2 and is less than or equal to N. Alternatively, the N first sequences are acquired from different sequence sets. Alternatively, the N first sequences are acquired from different subsets of the same sequence set.

In an embodiment, a sequence set includes one or more of the following: a Hadamard sequence set, a sequence set obtained according to a Hadamard sequence set, a ZC sequence set, or a four-phase sequence set.

In an embodiment, the N first sequences are acquired randomly.

In an embodiment, the method further includes generating data and carrying information in the data. The information includes one or more of the following: the identification information of the N first sequences, the energy information of at least one first sequence among the N first sequences, the identification information of the second sequence, the energy information of the second sequence, or the identity identification information of the first communication node.

The identification information of the N first sequences is used for identifying the corresponding first sequences. The identification information of the second sequence is used for identifying the second sequence. The identity identification information of the first communication node is used for identifying the first communication node. The content of each piece of identification information is not limited here, as long as the corresponding content can be identified. In an example, the preceding identification information includes an index, a serial number, or an identification code.

Each piece of energy information may be the information identifying the energy of a corresponding sequence (for example, a first sequence or the second sequence). The content of each piece of energy information is not limited here, as long as the energy of a corresponding sequence can be identified. In an example, the preceding energy information includes an energy level or an energy ratio.

An exemplary description of the present application is made below. The signal processing method provided in the present application may be considered a reference signal generation method. In a random access scenario, the signal processing method may be considered a random access signal generation method.

For grant-free transmission, a terminal may send data autonomously without sending a scheduling request and waiting for dynamic scheduling. Therefore, grant-free transmission may reduce signaling overhead, transmission delay, and terminal power consumption. Additionally, grant-free transmission may also be combined with non-orthogonal transmission to increase the number of access users.

Grant-free transmission includes two solutions, that is, a pre-configured (that is, semi-persistent scheduling or configured grant) grant-free solution and a contention-based grant-free solution. For the pre-configured grant-free solution, a base station may pre-configure or semi-persistently configure, for example, a time-frequency resource and a pilot sequence for each terminal. Such arrangement may guarantee that time-frequency resources and/or pilot sequences and the like used by multiple terminals are different, thereby avoiding collisions and facilitating user identification and detection. An available time-frequency resource is usually periodic and relatively suitable for a periodic traffic but may result in low transmission efficiency and relatively large delay when being used for a random burst traffic. For the contention-based grant-free solution, when a terminal has a traffic arriving, a time-frequency resource, a pilot sequence, and the like may be selected randomly for contention-based access and transmission. Time-frequency resources, pilot sequences, and the like used by multiple terminals may collide with each other. A receiver needs to implement user identification and detection through a more complex or advanced blind detection algorithm. With better transmission efficiency and lower delay, the contention-based grant-free solution is more suitable for a random burst traffic.

The contention-based grant-free solution may be implemented based on the channel structure of "a pilot+data". The base station implements a multi-user detection through a pilot. The pilot at least includes, for example, a preamble or a reference signal.

Figure 1A:
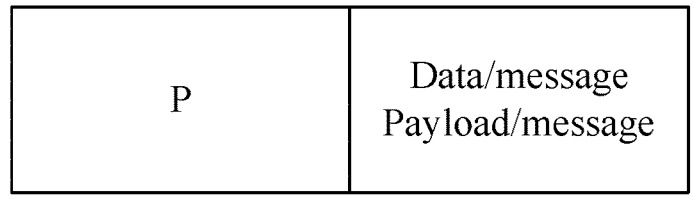
FIG. 1A is a diagram illustrating the structure of a transmission frame of a traditional contention-based grant-free solution based on "a pilot+data".

FIG. 1A is a diagram illustrating the structure of a transmission frame of a traditional contention-based grant-free solution based on "a pilot+data". As shown in FIG. 1A, one pilot is used in the traditional solution. The pilot may be composed of one sequence. A receiver performs user identification and detection through the pilot. When two users select different pilots, the two users may be received and detected correctly. When two users select the same pilot, that is, when a collision occurs, the receiver can identify only one user and can obtain only one channel estimation result. Moreover, the channel estimation result is the sum of channels of the two users. In this case, if the power of one user equipment (UE) is equal to the power of the other UE, it is probable that neither user can be decoded correctly. Due to the limited number of pilots, with the number of users increasing, collision conditions may deteriorate rapidly, thereby affecting the number of access users supported by the system.

Therefore, for pilot-based contention-based grant-free transmission, the number of pilots is limited. In the case of a relatively large number of access users, pilot collisions are relatively serious, affecting the performance of grant-free transmission. The present application provides a reference signal generation method that helps reduce pilot collisions and thereby improves the performance of contention-based grant-free transmission.

Figure 1B:
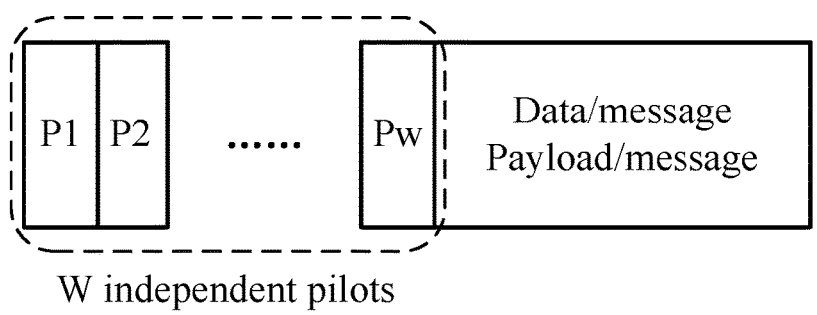
FIG. 1B is a diagram illustrating the structure of a transmission frame of a contention-based grant-free solution based on "multiple pilots+data".

In an embodiment, FIG. 1B is a diagram illustrating the structure of a transmission frame of a contention-based grant-free solution based on "multiple pilots+data". As shown in FIG. 1B, the main idea of the solution with multiple pilots is to design multiple independent or randomly selected pilots at the same resource overhead. The receiver performs user identification and detection through multiple pilots. If two users collide with each other on pilot 1 and no collision occurs on pilot 2, user identification and detection can still be implemented through pilot 2. Then interference cancellation is performed, thereby improving the performance of detecting other users.

For the solution shown in FIG. 1A, it is assumed that a candidate pilot set includes N orthogonal pilot sequences. In an example in which two users contend for access, the collision rate is 1/N. For the solution shown in FIG. 1B, it is assumed that two independent pilots exist, that is, w=2. Moreover, it is assumed that pilot overhead is unchanged. In this case, each pilot may be selected randomly from a candidate pilot set including N/2 orthogonal pilot sequences. Then the collision rate of the two users contending for access is that $(2/N)^2=4/N^2$. It can be seen that the collision rate of the latter is 4/N of the collision rate of the former. That is, when N is greater than 4, the collision rate of the latter is lower. Moreover, as N increases, the collision rate of the latter is increasingly lower compared with the collision rate of the former. For example, when N=24, the collision rate of the latter is 1/6 of the collision rate of the former; when N=48, the collision rate of the latter is 1/12 of the collision rate of the former. Therefore, the contention-based grant-free solution based on "multiple pilots+data" may reduce the collision rate and increase the number of access users.

For the configuration or structure of multiple pilots, one case is that the pilots occupy different time-frequency resources.

Figure 1C:
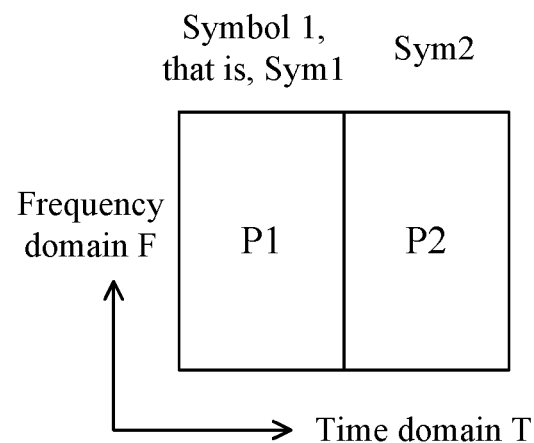
FIG. 1C is a diagram illustrating time-frequency resources occupied by two pilots according to an embodiment of the present application.

An example is taken in which two pilots are used. FIG. 1C is a diagram illustrating time-frequency resources occupied by two pilots according to an embodiment of the present application. Referring to FIG. 1C, time-frequency resources occupied by two pilots P1 and P2 occupy the same frequency-domain resource position in the frequency domain and occupy different symbols in the time domain. Moreover, the symbols may be continuous or discontinuous. This case may be referred to as time-division multiple pilots.

Figure 1D:
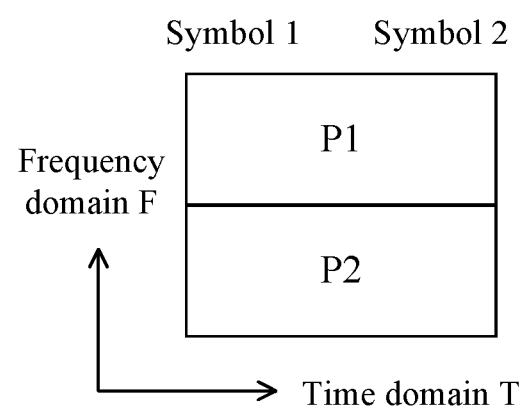
FIG. 1D is a diagram illustrating another time-frequency resources occupied by two pilots according to an embodiment of the present application.

FIG. 1D is a diagram illustrating another time-frequency resources occupied by two pilots according to an embodiment of the present application. As shown in FIG. 1D, time-frequency resources occupied by two pilots P1 and P2 occupy the same symbol position in the time domain (with two symbols being continuous or discontinuous) and occupy different frequency-domain resources in the frequency domain. Moreover, the frequency-domain resources may be continuous or discontinuous. This case may be referred to as frequency-division multiple pilots.

Figure 1E:
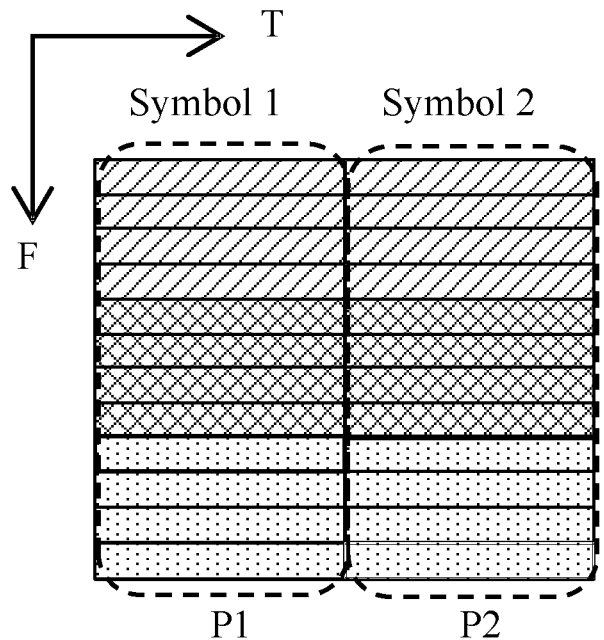
FIG. 1E is a diagram of time-division multiple pilots according to an embodiment of the present application.
Figure 1F:
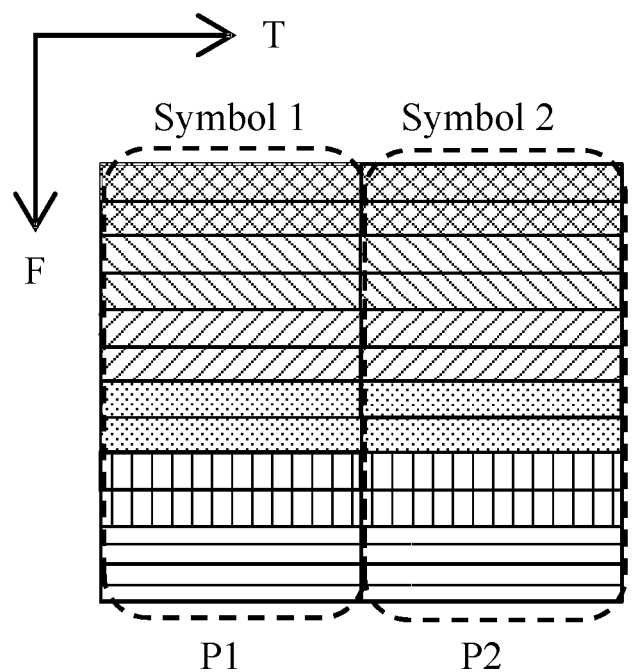
FIG. 1F is a diagram of another time-division multiple pilots according to an embodiment of the present application.

In an implementation, different embodiments may exist. FIG. 1E is a diagram of time-division multiple pilots according to an embodiment of the present application. FIG. 1F is a diagram of another time-division multiple pilots according to an embodiment of the present application. As shown in FIGS. 1E and 1F, for time-division multiple pilots, time-frequency resources occupied by two pilots P1 and P2 occupy different symbols in the time domain. In the frequency domain, they are each randomly selected from available frequency-domain resources. The same frequency-domain resource position or different frequency-domain resources may be used. For FIG. 1E, it is assumed that the frequency-domain resources include twelve resource elements (REs) that are divided into three groups. Each group includes four REs. Pilot P1 selects a group of resources randomly from the three groups of frequency-domain resources of a first symbol. Pilot P2 selects a group of resources randomly from the three groups of frequency-domain resources of a second symbol. For FIG. 1F, twelve REs in the frequency domain are divided into six groups. Each group includes two REs. Pilot P1 selects a group of resources randomly from the six groups of frequency-domain resources of a first symbol. Pilot P2 selects a group of resources randomly from the six groups of frequency-domain resources of a second symbol. Such structure may also be referred to as a comb structure. Each group of resources may be referred to as one comb. Therefore, it may also be considered that each pilot selects one comb randomly.

Figure 1G:
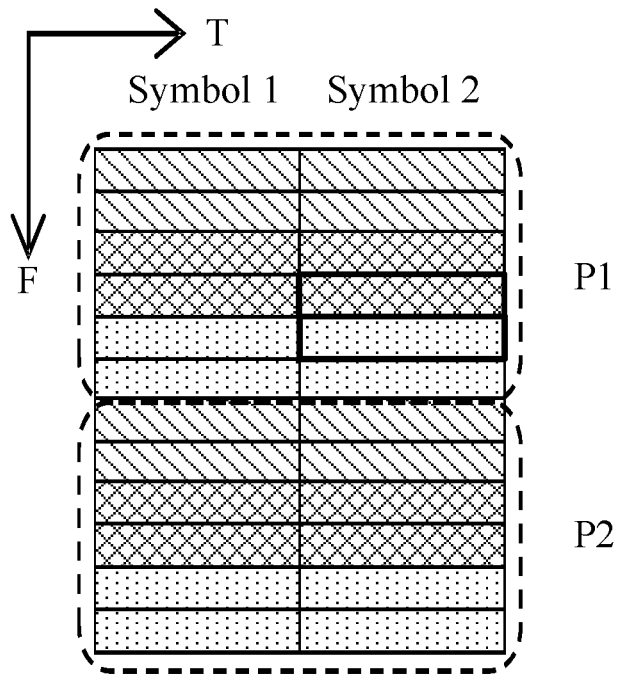
FIG. 1G is a diagram of frequency-division multiple pilots according to an embodiment of the present application.

For frequency-division multiple pilots, an implementation may be performed similarly. For example, FIG. 1G is a diagram of frequency-division multiple pilots according to an embodiment of the present application. As shown in FIG. 1G, time-frequency resources occupied by two pilots P1 and P2 occupy the same symbol position in the time domain. In the frequency domain, they are each randomly selected from available frequency-domain resources. Here twelve REs in the frequency domain are divided into two groups. Each group includes six REs. The two groups are used by pilot P1 and pilot P2 separately. Each group of resources is divided into three sub-groups. Each sub-group includes two REs. For one UE, pilot P1 selects one sub-group resource randomly from the three sub-groups of a first group of resources, and pilot P2 selects one sub-group resource from the three sub-groups of a second group of resources.

Figure 1H:
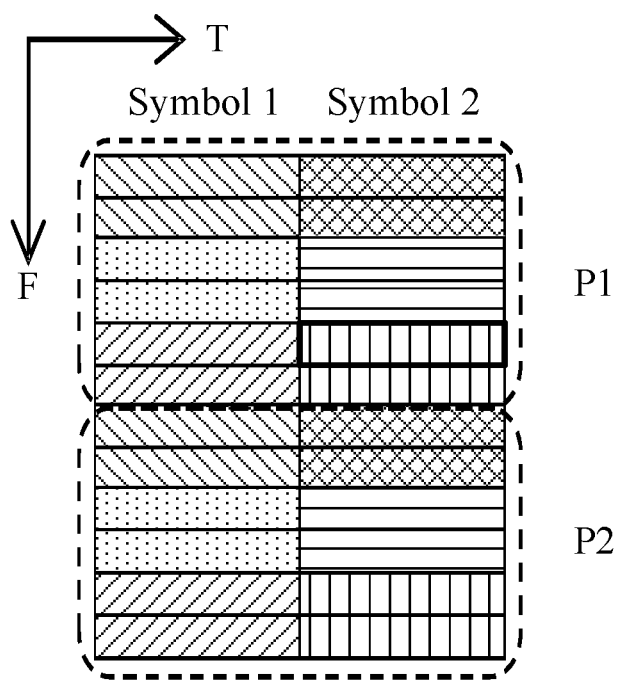
FIG. 1H is a diagram of time-frequency-division multiple pilots according to an embodiment of the present application.

An implementation of time-frequency-division multiple pilots may also be performed. FIG. 1H is a diagram of time-frequency-division multiple pilots according to an embodiment of the present application. As shown in FIG. 1H, time-frequency resources including twelve REs in the frequency domain and two symbols in the time domain are divided into two groups in the frequency domain. Each group includes six REs. The two groups are used by pilot P1 and pilot P2 separately. Each group of resources is time-frequency divided to obtain six sub-groups. Each sub-group includes two REs in the frequency domain and one symbol in the time domain. For a UE, pilot P1 selects one sub-group resource randomly from the six sub-groups of a first group of resources, and pilot P2 selects one sub-group resource randomly from the six sub-groups of a second group of resources.

Frequency-domain resources finally used by each pilot in the preceding examples are continuous and may also be discontinuous actually.

When multiple pilots of one user occupy different time-frequency resources, for different pilots Px where x=1, . . . , and w, the same pilot sequence set may be used. For example, P1, P2, . . . , and Pw are each selected randomly from pilot sequence set S.

A pilot sequence set may be an orthogonal sequence set. For example, for the time-division multiple pilots shown in FIG. 1C, it is assumed that the frequency domain includes twelve REs. In this case, a pilot sequence set may be a set including twelve orthogonal Hadamard sequences each of which has a length of 12. Each pilot selects one pilot sequence with a length of 12 from the set. For the frequency-division multiple pilots shown in FIG. 1D, it is assumed that the frequency domain includes twelve REs, that two pilots each occupy six REs, and two symbols in the time domain. In this case, a pilot sequence set may be a set including twelve orthogonal Hadamard sequences each of which has a length of 12. Each pilot selects one pilot sequence with a length of 12 from the set. Then the pilot sequence is mapped to the corresponding six REs in the frequency domain and two symbols in the time domain. In this case, for any pilot Px, pilots of multiple users are code-divided. When the users select the same pilot sequence, a collision may occur. As shown above, the probability of collisions occurring on two pilots of two UEs is that $(1/12)^2=1/144$.

For the time-division multiple pilots shown in FIG. 1E, each pilot occupies four REs in the frequency domain. In this case, a pilot sequence set may be a set including four orthogonal Hadamard sequences each of which has a length of 4. Each pilot selects one pilot sequence with a length of 4 from the set. Similarly, for the time-division multiple pilots shown in FIG. 1F, each pilot occupies two REs in the frequency domain. In this case, a pilot sequence set may be a set including two orthogonal Hadamard sequences each of which has a length of 2. Each pilot selects one pilot sequence with a length of 2 from the set.

For the frequency-division multiple pilots shown in FIG. 1G, each pilot occupies two REs in the frequency domain, and two symbols in the time domain. In this case, a pilot sequence set may be a set including four orthogonal Hadamard sequences each of which has a length of 4. Each pilot selects one pilot sequence with a length of 4 from the set. Then the pilot sequence is mapped to the corresponding two REs in the frequency domain and two symbols in the time domain. The pilot sequence set may also include sequence set A and orthogonal cover code set B. Sequence set A may be a set including two orthogonal Hadamard sequences each of which has a length of 2. Orthogonal cover code set B may be a set including two orthogonal Hadamard sequences each of which has a length of 2. One column is selected randomly from sequence set A to obtain a 2*1 sequence. One row is selected randomly from orthogonal cover code set B to obtain a 1*2 sequence. Then matrix multiplication is performed on the two sequences to obtain a 2*2 matrix which serves as a pilot to be mapped to the corresponding two REs in the frequency domain and two symbols in the time domain.

For the frequency-division multiple pilots shown in FIG. 1H, similar to FIG. 1F, each pilot occupies two REs in the frequency domain, and one symbol in the time domain. In this case, a pilot sequence set may be a set including two orthogonal Hadamard sequences each of which has a length of 2. Each pilot selects one pilot sequence with a length of 2 from the set. Then the pilot sequence is mapped to the corresponding two REs in the frequency domain and one symbol in the time domain.

For the cases shown in FIGS. 1E to 1H, it may be considered that a pilot set includes candidate (comb) pilot resources and a set of orthogonal pilot sequences each of which is relatively short. This case may also be equivalent to a set of sparse orthogonal pilot sequences each of which is relatively long. That is, the pilot sequence elements in the positions corresponding to pilot resources are the elements of an orthogonal pilot sequence which is relatively short, and the pilot sequence elements in the other resource positions are 0. Finally, twelve sparse orthogonal sequences each of which has a length of 12 may be obtained.

For the cases shown in FIGS. 1E to 1H, for any pilot Px, pilots of multiple users are frequency-divided, time-frequency-divided, or code-divided. Of course, if equivalent to sparse pilot sequences, the pilots may be considered code-divided.

An available pilot (including a time-frequency resource and/or a pilot sequence) in the preceding examples may also correspond to an antenna port. Each available pilot corresponds to one port. When a UE uses multiple antenna ports, the UE may use multiple groups of pilots (or consider any preceding pilot Px as a group of pilots). Each group of pilots includes multiple pilots corresponding to multiple ports. Moreover, the pilots may be selected randomly.

One UE may transmit multiple layers of data or multiple data streams. The UE may use multiple groups of pilots. Each group of pilots includes multiple pilots corresponding to multiple layers of data or multiple data streams. Moreover, the pilots may be selected randomly. Alternatively, each layer of data of the UE or each data stream of the UE is considered one virtual UE. Each virtual UE uses multiple pilots according to the preceding examples.

For multiple antenna ports, multiple layers of data, or multiple data streams, the UE may also perform power allocation or perform amplitude adjustment on a transmitted symbol. Additionally, the UE may also perform operations including phase adjustment or precoding processing.

In an embodiment, the means of combining the N first sequences may be through superimposition.

Figure 1I:
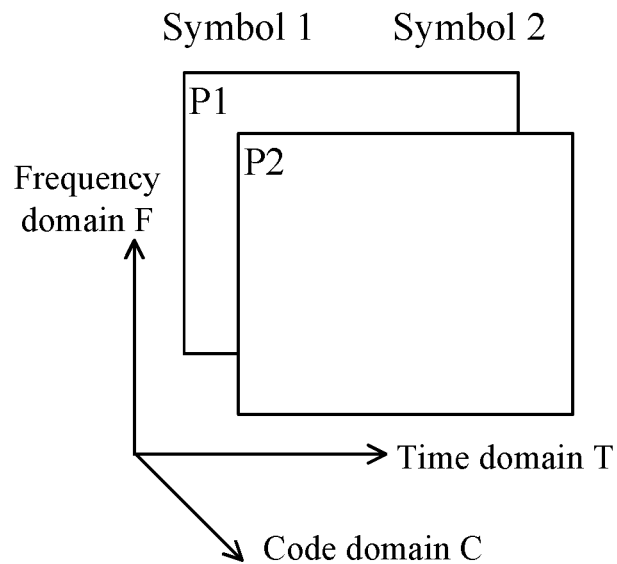
FIG. 1I is a diagram of code-division multiple pilots according to an embodiment of the present application.

For the configuration or structure of multiple pilots, another case is that the pilots occupy the same time-frequency resource. An example is taken in which two pilots are used. FIG. 1I is a diagram of code-division multiple pilots according to an embodiment of the present application. Referring to FIG. 1I, two pilots P1 and P2 occupy the same time-frequency resource, and a certain differentiation may be made in the code domain. That is, the differentiation may be made through pilot sequences. This case may be referred to as code-division multiple pilots.

The code-division multiple pilots may be divided into the three cases below.

(1) Pilot sequences (that is, the N first sequences) of multiple pilots are from different pilot sequence sets (that is, the sequence sets). For example, pilot sequences used by two pilots P1 and P2 are selected randomly from pilot sequence sets S1 and S2 respectively.

(2) Pilot sequences of multiple pilots are from the same pilot sequence set and are guaranteed to be different. For example, two different pilot sequences are selected randomly from pilot sequence set S to serve as pilot sequences used by two pilots P1 and P2.

(3) Pilot sequences of multiple pilots are from the same pilot sequence set, and the selection of the same pilot sequence is allowed. That is, it is possible that two or more pilot sequences are the same. For example, pilot sequences used by two pilots P1 and P2 are selected randomly from pilot sequence set S, and the selected pilot sequence used by one pilot may be the same as the selected pilot sequence used by another pilot. When using the same pilot sequence, the two pilots may be equivalent to one pilot.

Figure 1J:
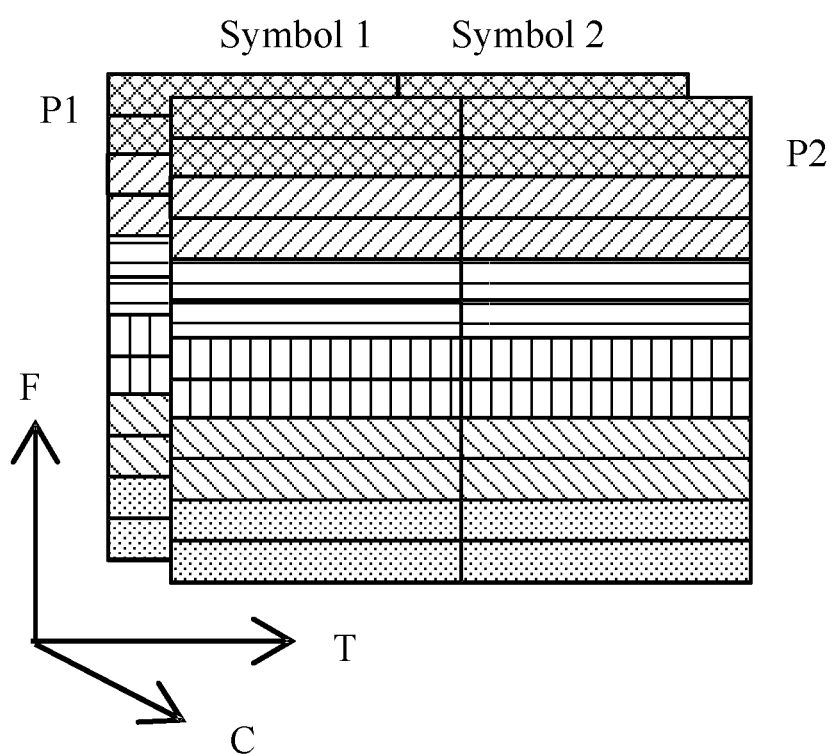
FIG. 1J is a diagram of another code-division multiple pilots according to an embodiment of the present application.

FIG. 1J is a diagram of another code-division multiple pilots according to an embodiment of the present application. Referring to FIG. 1J, it is assumed that available pilot resources include twelve REs in the frequency domain and two symbols in the time domain. The resources are divided into six groups in the frequency domain. That is, each group of pilot resources (or each comb resource) includes two REs in the frequency domain and two symbols in the time domain.

Pilot sequence set S used on each group of pilot resources may be a set including four orthogonal Hadamard sequences each of which has a length of 4. The pilot sequence set may also include sequence set A and orthogonal cover code set B. Sequence set A may be a set including two orthogonal Hadamard sequences each of which has a length of 2. Orthogonal cover code set B may be a set including two orthogonal Hadamard sequences each of which has a length of 2.

In this case, it may be considered that a pilot set includes candidate pilot resources and a set of orthogonal pilot sequences each of which is relatively short. Of course, this case may also be equivalent to that the pilot set is a set of sparse orthogonal pilot sequences each of which is relatively long.

In this example, multiple pilots may be from different pilot sets. Alternatively, multiple pilots are from the same pilot set and are guaranteed to be different. Alternatively, multiple pilots are from the same pilot set, and any two pilots may be the same. An example is taken in which two pilots are used. For example, pilot sequence set S used on each group of pilot resources is divided into two subsets S1 and S2. Pilot P1 selects a group of pilot resources randomly from six groups of pilot resources and then selects a pilot sequence from subset S1. Pilot P2 selects a group of pilot resources randomly from six groups of pilot resources and then selects a pilot sequence from subset S2. Alternatively, two different combinations are selected randomly from all the combinations of candidate pilot resources and candidate pilot sequences to serve as pilot P1 and pilot P2. Alternatively, two combinations are selected randomly from all the combinations of candidate pilot resources and candidate pilot sequences to serve as pilot P1 and pilot P2. In this case, pilot P1 may be the same as pilot P2. If pilot P1 is the same as pilot P2, pilot P1 and pilot P2 may be equivalent to one pilot.

Under the condition of limited total energy, when multiple pilots are used, the energy of each pilot may be reduced, thereby affecting channel estimation and affecting the capability of suppressing noise.

For code-division multiple pilots, two cases below are considered for the energy allocation of the pilots.

(1) The total energy is equally allocated among multiple pilots. That is, the energy of each pilot is the same.

(2) The total energy is unevenly allocated among multiple pilots. That is, the energy of each pilot may be different. For example, the total energy is divided into multiple energy levels. The energy indicated by each energy level is equal or unequal. Multiple pilots select one of the energy levels randomly. The energy level index of one pilot is different from the energy level index of another pilot, ensuring that the total energy remains unchanged, is equal to preset total energy, or does not exceed preset total energy. In an example, one of the energy levels may be 0, which is equivalent to not sending a pilot. The saved energy may be used for sending other pilots. For the case where the UE uses two pilots, if the energy of one pilot is not 0 and the energy of the other pilot is 0, it is equivalent to that the UE uses one pilot actually.

For uneven energy allocation, in order to perform reconstruction and interference cancellation on a pilot symbol, the UE may carry the energy allocation related information of multiple pilots in the data payload sent by the UE. For example, the energy allocation indication of each of the pilots is carried. Alternatively, the energy level index of one of the pilots is carried. In this case, multiple energy levels may be successively and circularly used among the pilots. After the energy level index of one pilot is determined, energy levels of other pilots may be determined successively.

For different time-frequency resources occupied by multiple pilots, energy allocation may also be performed among the pilots. The total energy is equally or unevenly allocated among the pilots. For time-division multiple pilots, due to power control, in some cases (for example, when the UE reaches the maximum transmission power), the energy of each pilot would be the same.

The energy allocation here may be implemented through operations including power allocation, power control, amplitude adjustment, or energy normalization.

In an example, for the code-division multiple pilots shown in FIG. 1I, from the sending end of one UE, the UE acquires multiple pilot sequences first, then superimposes the pilot sequences to obtain a superimposed sequence, and then generates a pilot or a reference signal according to the superimposed sequence, with the pilot or the reference signal for being sent.

An example is taken in which two pilots are used. The UE acquires two pilot sequences (that is, first sequences) C1 and C2 first. Then the UE superimposes two pilot sequences C1 and C2 to obtain superimposed sequence C, where C=C1+C2. Later the UE generates a pilot or a reference signal according to superimposed sequence C.

If pilot sequences of multiple pilots are from different pilot sequence sets, or if pilot sequences of multiple pilots are from the same pilot sequence set and are guaranteed to be different, the UE may adjust the energy of pilot sequence C1 and the energy of pilot sequence C2 first and then superimpose pilot sequence C1 and pilot sequence C2 to obtain superimposed sequence C. For example, it is assumed that the length of pilot sequence C1 and the length of pilot sequence C2 are each L and that the element energy of each of the two sequences is normalized to 1. The total energy of each of the two pilot sequences is L. C1√2 and C2/√2 may be acquired after energy adjustment is performed on two pilot sequences C1 and C2 respectively. Then superimposed sequence C may be that $$C = \frac{C1}{\sqrt{2}} + \frac{C2}{\sqrt{2}}.$$

In this case, the total energy of sequence C obtained through superimposition is still L.

Alternatively, it is assumed that the length of pilot sequence C1 and the length of pilot sequence C2 are each L, that the element energy of each of the two sequences is normalized to 1, and that the target total energy of pilots is E. The target total energy of each of the two pilot sequences may be E/2.

$$\sqrt{\frac{E}{2L}}\,C1 \text{ and } \sqrt{\frac{E}{2L}}\,C2$$

may be acquired after energy adjustment is performed on two pilot sequences C1 and C2 respectively. Then superimposed sequence C may be that $$C = \sqrt{\frac{E}{2L}}\,C1 + \sqrt{\frac{E}{2L}}\,C2.$$

In this case, the total energy of sequence C obtained through superimposition is E.

If pilot sequences of multiple pilots are from the same pilot sequence set and any two pilot sequences may be the same, energy normalization may be performed on sequence C to obtain sequence D before a pilot or a reference signal is generated according to sequence C. Then a pilot or a reference signal is generated according to sequence D. For example, $$D = \sqrt{\frac{E}{C^*C}}\,C.$$

It is assumed that C is an L*1 sequence. ( )* represents conjugate transpose. The total energy of sequence C may be obtained according to C*C. The purpose of such processing is to ensure that the total pilot energy remains unchanged, is equal to preset total energy E, or does not exceed preset total energy E, especially when two pilot sequences of one UE are the same. Of course, this method in which energy adjustment is performed on sequence C obtained through superimposition may also be used for the case where pilot sequences of multiple pilots are from different pilot sequence sets or the case where pilot sequences of multiple pilots are from the same pilot sequence set and are guaranteed to be different.

In an example, for the code-division multiple pilots shown in FIG. 1J, from the sending end of one UE, the UE acquires multiple pilots first, then superimposes the pilots to obtain a superimposed pilot, and then generates a reference signal according to the superimposed pilot, with the reference signal for being sent.

An example is taken in which two pilots are used. The UE (that is, the first communication node) acquires two pilots P1 and P2 first. Then the UE superimposes two pilots P1 and P2 to obtain superimposed pilot P, where P=P1+P2. Later the UE generates a reference signal according to superimposed pilot P.

If multiple pilots (corresponding to the N first sequences) are from different pilot sets, or if multiple pilots are from the same pilot set and are guaranteed to be different, the UE may adjust the energy of pilot P1 and the energy of pilot P2 first and then superimpose pilot P1 and pilot P2 to obtain superimposed pilot P. For example, it is assumed that the pilot sequence used by pilot P1 is C1, that the pilot sequence used by pilot P2 is C2, that the length of each of the two sequences is L, that the element energy of each of the two sequences is normalized to 1, and that the target total energy of the pilots is E. The target total energy of each pilot may be E/2.

$$\sqrt{\frac{E}{2L}}\,C1 \text{ and } \sqrt{\frac{E}{2L}}\,C2$$

may be acquired after energy adjustment is performed on the pilot sequence used by pilot P1 and the pilot sequence used by pilot P2 respectively. If comb time-frequency resources used by the two pilots are different, the pilot sequence used by pilot P1 and the pilot sequence used by pilot P2, after energy adjustment, may be each mapped to a corresponding time-frequency resource. The pilot sequence used by one pilot is mapped to the time-frequency resource used by the pilot. Other time-frequency resource positions not used by the pilot are equivalent to carrying zero elements. When time-frequency resources used by the two pilots are different, each pilot sequence is mapped to a corresponding time-frequency resource. This is equivalent to that the two pilots are superimposed. When comb time-frequency resources used by the two pilots are the same, energy adjustment may be performed on the pilot sequence used by pilot P1 and the pilot sequence used by pilot P2, and the pilot P1 and pilot P2 are superimposed to obtain that $$C = \sqrt{\frac{E}{2L}}\,C1 + \sqrt{\frac{E}{2L}}\,C2.$$

Later sequence C is mapped to a corresponding time-frequency resource for generating a reference signal.

If multiple pilots are from the same pilot set and any two pilots may be the same, when two pilots P1 and P2 of the UE are the same, time-frequency resources used by pilots P1 and P2 are the same and pilot sequences used by pilots P1 and P2 are the same. Similarly, pilot sequences used by the two pilots may be superimposed to obtain superimposed sequence C, where C=C1+C2. Then energy normalization may be performed on sequence C to obtain sequence D, where $$D = \sqrt{\frac{E}{C^*C}}\,C,$$

ensuring that the total pilot energy remains unchanged, is equal to preset total energy E, or does not exceed preset total energy E. Later sequence D is mapped to a corresponding time-frequency resource for generating a reference signal. Of course, this method in which energy adjustment is performed on sequence C obtained through superimposition may also be used for the case where multiple pilots are from different pilot sets or the case where multiple pilots are from the same pilot set and are guaranteed to be different.

With respect to the case of collisions of the code-division multiple pilots, for the case shown in FIG. 1I, it is assumed that pilot resources include twelve REs in the frequency domain and two symbols in the time domain. In this case, if a set of orthogonal pilot sequences is used, the set may be a set including 24 orthogonal Hadamard sequences each of which has a length of 24. An example is taken in which two pilots are used. Pilot sequences of two pilots of one UE may be from two sets S1 and S2. For example, set S1 includes half of the sequences in set S, and set S2 includes the other half of the sequences in set S. That is, sets S1 and S2 each include twelve sequences each of which has a length of 24. In this case, the probability of collisions occurring on two pilots of two UEs is $1/144$. This collision probability is the same as the collision rate of time-division/frequency-division multiple pilots. If pilot sequences of two pilots of one UE are each from set S, the probability of collisions occurring on two pilots of two UEs is that $(1/24)^2=1/576$. It can be seen that the use of code-division multiple pilots enables each first sequence to be acquired from a relatively large sequence set and have a wider selection range, thereby reducing the probability of collisions occurring on multiple pilots.

However, for the case where pilot sequences of two pilots of one UE are each from set S and the selection of the same sequence is allowed, one problem is that when the pilot sequences used by the two pilots are different or orthogonal, an energy normalization factor is $1/\sqrt{2}$, and that when the pilot sequences used by the two pilots are the same, an energy normalization factor is $1/2$. It can be seen that energy normalization factors are not unique. This has a certain effect on the reception and detection performed by the receiver. When performing blind detection through the two pilots, the receiver does not know the pilot sequences selected by the UE and cannot use a corresponding energy normalization factor. In one manner, the energy normalization factor $1/\sqrt{2}$ may be used uniformly considering that the ratio of the two pilots using the same pilot sequence is lower. This problem does not exist for the case where pilot sequences of two pilots of one UE are from two sets S1 and S2 or the case where pilot sequences of two pilots are each from set S and are guaranteed to be different. In this case, the energy normalization factor $1/\sqrt{2}$ may be used uniformly.

For the case shown in FIG. 1J, a pilot set includes candidate pilot resources and a set of orthogonal pilot sequences each of which is relatively short. In this case, collisions and the problem of energy normalization may be analyzed in a similar manner, where the energy normalization factor may be different, but the principles are similar.

In an embodiment, the means of combining the N first sequences may be through combination.

In this embodiment, it is assumed that the total time-frequency resource overhead occupied by a pilot is 24 resource elements. In this embodiment, the terminal (UE) acquires two sequences (that is, first sequences) first. This includes that the terminal selects two sequences C1 and C2 randomly from sequence set A. Sequence set A includes twelve orthogonal sequences each of which has a length of 12. In this case, sequences C1 and C2 are each a sequence with a length of 12.

Figure 1K:
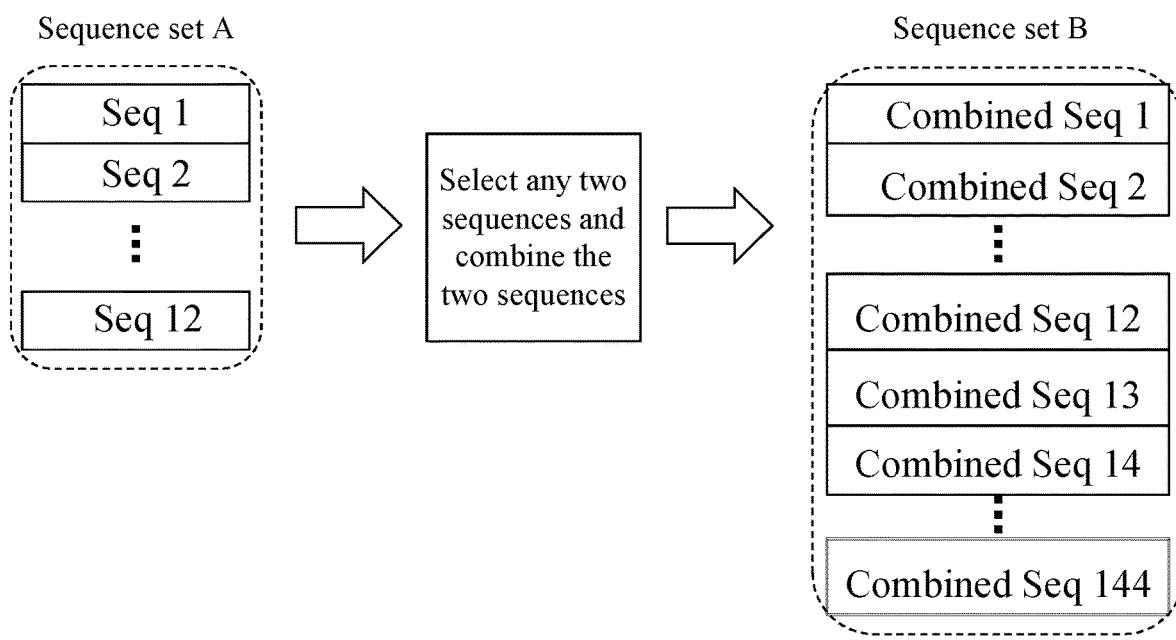
FIG. 1K is a diagram illustrating the generation of a non-orthogonal sequence set according to an embodiment of the present application.

The terminal combines two sequences C1 and C2 (for example, in series) to obtain sequence C (that is, the second sequence) with a length of 24. Sequence set A includes twelve orthogonal sequences each of which has a length of 12. Two sequences are selected randomly from sequence set A and are combined to obtain a sequence with a length of 24. In this case, 144 sequences each of which has a length of 24 may be obtained totally. That is, sequence set B may be obtained. Sequence set B includes 144 sequences each of which has a length of 24. Moreover, sequence set B is a non-orthogonal sequence set. FIG. 1K is a diagram illustrating the generation of a non-orthogonal sequence set according to an embodiment of the present application. As shown in FIG. 1K, it may be considered that obtained sequence C (that is, the second sequence) is from the non-orthogonal sequence set.

That the terminal generates a reference signal according to obtained sequence C includes that sequence C is mapped to a time-frequency resource used by a pilot for generating the reference signal, or that designated processing is performed on sequence C, the processed sequence C is mapped to a time-frequency resource used by a pilot for generating the reference signal. The designated processing includes at least one of the following: energy normalization, energy adjustment, power adjustment, amplitude adjustment, phase adjustment, precoding processing, scrambling processing, or the like.

In this embodiment, Table 1 is the set table of one type of sequence set A. Sequence set A may be a set including twelve orthogonal Hadamard sequences each of which has a length of 12, as shown in Table 1. According to the preceding description of this embodiment, for sequence set A shown in Table 1, set B including 144 non-orthogonal sequences each of which has a length of 24 may be constructed.

TABLE 1

Set Table of One Type of Sequence Set A

| Sequence Index | Sequence Element Index and Sequence Element | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| 1 | 1 | 1 | 1 | 1 | 1 | 1 | 1 | 1 | 1 | 1 | 1 | 1 |
| 2 | 1 | -1 | 1 | -1 | 1 | 1 | 1 | -1 | -1 | -1 | 1 | -1 |
| 3 | 1 | -1 | -1 | 1 | -1 | 1 | 1 | 1 | -1 | -1 | -1 | 1 |
| 4 | 1 | 1 | -1 | -1 | 1 | -1 | 1 | 1 | 1 | -1 | -1 | -1 |
| 5 | 1 | -1 | 1 | -1 | -1 | 1 | -1 | 1 | 1 | 1 | -1 | -1 |
| 6 | 1 | -1 | -1 | 1 | -1 | -1 | 1 | -1 | 1 | 1 | 1 | -1 |
| 7 | 1 | -1 | -1 | -1 | 1 | -1 | -1 | 1 | -1 | 1 | 1 | 1 |
| 8 | 1 | 1 | -1 | -1 | -1 | 1 | -1 | -1 | 1 | -1 | 1 | 1 |
| 9 | 1 | 1 | 1 | -1 | -1 | -1 | 1 | -1 | -1 | 1 | -1 | 1 |
| 10 | 1 | 1 | 1 | 1 | -1 | -1 | -1 | 1 | -1 | -1 | 1 | -1 |
| 11 | 1 | -1 | 1 | 1 | 1 | -1 | -1 | -1 | 1 | -1 | -1 | 1 |
| 12 | 1 | 1 | -1 | 1 | 1 | 1 | -1 | -1 | -1 | 1 | -1 | -1 |

Figure 1L:
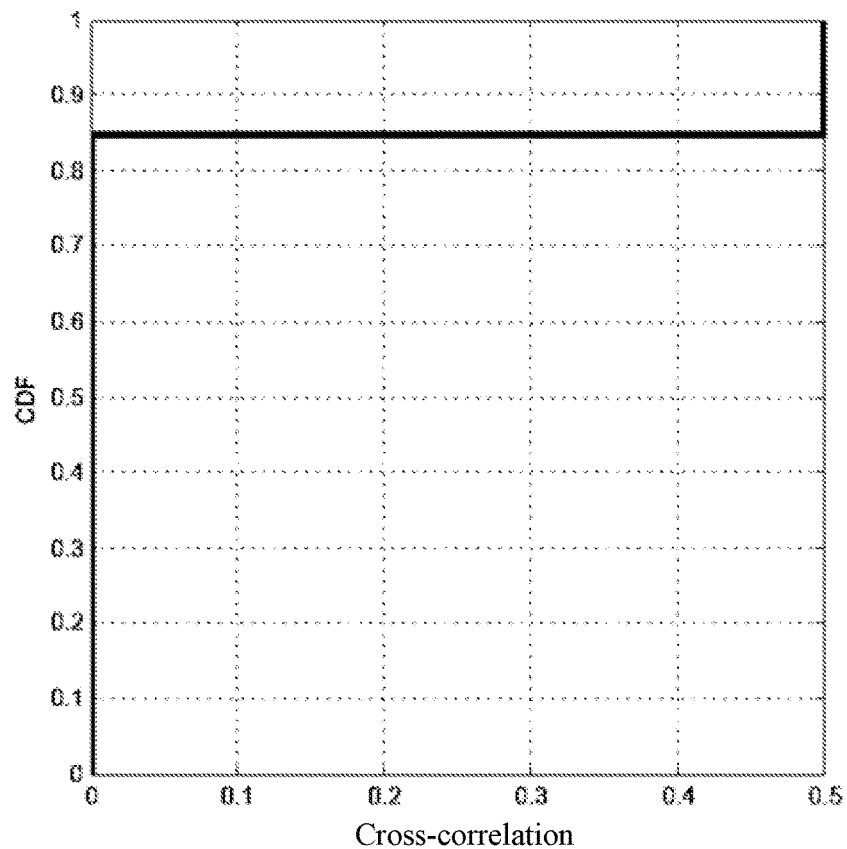
FIG. 1L is a diagram illustrating the CDF distribution of sequence cross-correlation values according to an embodiment of the present application.

FIG. 1L is a diagram illustrating the CDF distribution of sequence cross-correlation values according to an embodiment of the present application. Referring to FIG. 1L, it can be seen based on the cumulative distribution function (CDF) and cross-correlation values that about 85% of the sequence cross-correlation values and about 15% of the sequence cross-correlation values are 0 and 0.5 respectively.

In this embodiment, Table 2 is the set table of another type of sequence set A. Sequence set A may also be a sequence set shown in Table 2. The sequence set also includes twelve orthogonal sequences each of which has a length of 12. Each sequence is sparse. Moreover, the sequence set may be considered a combination of a comb resource structure including three combs and a set including four orthogonal Hadamard sequences each of which has a length of 4. According to the preceding description of this embodiment, for sequence set A shown in Table 2, set B including 144 non-orthogonal sequences each of which has a length of 24 may also be constructed. Cross-correlation features between the sequences are the same as features shown in FIG. 1L, that is, the same as cross-correlation features of non-orthogonal sequence set B formed on the basis of sequence set A shown in Table 1.

TABLE 2

Set Table of Another Type of Sequence Set A

| Sequence Index | Sequence Element Index and Sequence Element | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| 1 | 1 | 1 | 1 | 1 | 0 | 0 | 0 | 0 | 0 | 0 | 0 | 0 |
| 2 | 1 | -1 | 1 | -1 | 0 | 0 | 0 | 0 | 0 | 0 | 0 | 0 |
| 3 | 1 | 1 | -1 | -1 | 0 | 0 | 0 | 0 | 0 | 0 | 0 | 0 |
| 4 | 1 | -1 | -1 | 1 | 0 | 0 | 0 | 0 | 0 | 0 | 0 | 0 |
| 5 | 0 | 0 | 0 | 0 | 1 | 1 | 1 | 1 | 0 | 0 | 0 | 0 |
| 6 | 0 | 0 | 0 | 0 | 1 | -1 | 1 | -1 | 0 | 0 | 0 | 0 |
| 7 | 0 | 0 | 0 | 0 | 1 | 1 | -1 | -1 | 0 | 0 | 0 | 0 |
| 8 | 0 | 0 | 0 | 0 | 1 | -1 | -1 | 1 | 0 | 0 | 0 | 0 |
| 9 | 0 | 0 | 0 | 0 | 0 | 0 | 0 | 0 | 1 | 1 | 1 | 1 |
| 10 | 0 | 0 | 0 | 0 | 0 | 0 | 0 | 0 | 1 | -1 | 1 | -1 |
| 11 | 0 | 0 | 0 | 0 | 0 | 0 | 0 | 0 | 1 | 1 | -1 | -1 |
| 12 | 0 | 0 | 0 | 0 | 0 | 0 | 0 | 0 | 1 | -1 | -1 | 1 |

In this embodiment, sequence set A may also be another orthogonal sequence set or non-orthogonal sequence set. For example, sequence set A is a sequence set combined by a comb resource structure including six combs and a set including two orthogonal Hadamard sequences each of which has a length of 2. Alternatively, sequence set A is a Zadoff-Chu (ZC) sequence set. Alternatively, the sequence set A is a four-phase sequence set. For example, a sequence element is from set {1+1i, −1+1i, −1−1i, 1−1i} or set {1, 1i, −1, −1i}. It can be seen that a candidate sequence element has four types of phase values. Therefore, such sequence set may be referred to as a four-phase sequence set.

In this embodiment, the arrangement of acquiring multiple sequences and combining the sequences helps obtain a non-orthogonal sequence set including a larger number of sequences. Moreover, the non-orthogonal sequence set has sound sequence structure features and cross-correlation features. When multiple UEs use the same time-frequency resource for transmission, the pilot sequence used by each UE is equivalent to being from the non-orthogonal sequence set. That is, the pilot sequences used by multiple UEs are non-orthogonal and have a relatively low collision probability. The receiver may use the non-orthogonal sequence set and its sequence structure features for reception and detection.

In an embodiment, it is assumed that the total time-frequency resource overhead occupied by a pilot is 24 REs.

In this embodiment, the terminal (UE) acquires two sequences (that is, first sequences) first. This includes that the terminal selects sequence C1 randomly from sequence set A1 and selects sequence C2 randomly from sequence set A2.

In this embodiment, sequence set A1 and sequence set A2 are from sequence set A. Sequence set A1 includes half of the sequences in sequence set A, and sequence set A2 includes the other half of the sequences in sequence set A.

For example, sequence set A includes 24 orthogonal sequences each of which has a length of 24, sequence set A1 is a sequence set composed of the first twelve sequences in sequence set A, and sequence set A2 is a sequence set composed of the last twelve sequences in sequence set A. In this case, sequence set A1 includes twelve orthogonal sequences each of which has a length of 24, and sequence set A2 includes twelve orthogonal sequences each of which has a length of 24. Sequences C1 and C2 are each a sequence with a length of 24.

In this embodiment, sequence set A1 includes half of the sequences in sequence set A, and sequence set A2 includes the other half of the sequences in sequence set A. Sequence set A1 and sequence set A2 are not limited to the first half of the sequences in sequence set A and the last half of the sequences in sequence set A, but may be any half of the sequences and the other half of the sequences.

In this embodiment, it is not limited that sequence set A1 and sequence set A2 are each from sequence set A. Sequence set A1 and sequence set A2 may also be two independent sequence sets.

Figure 1M:
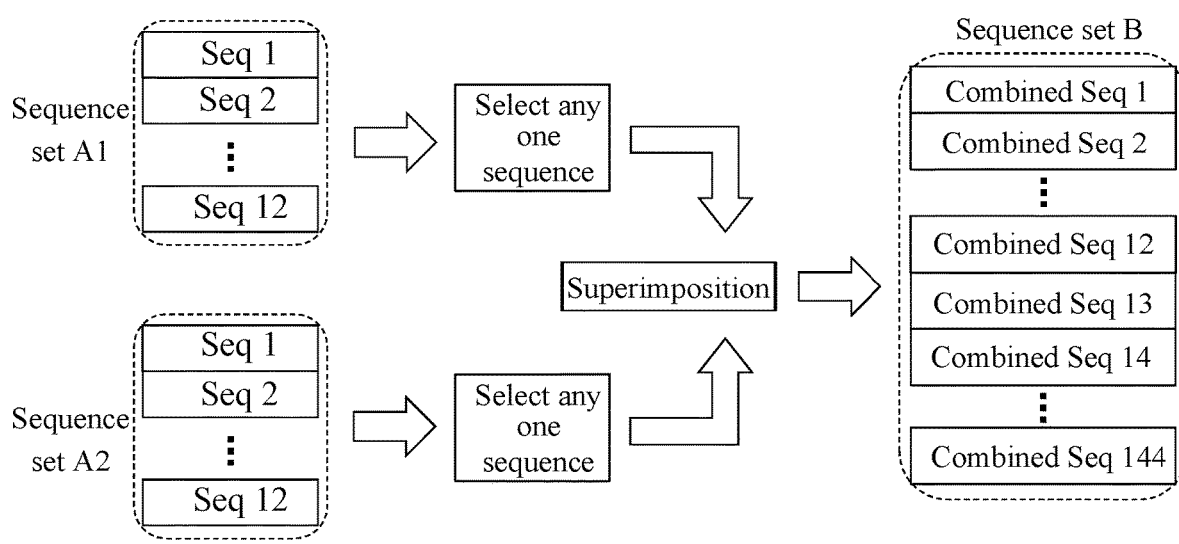
FIG. 1M is a diagram illustrating the generation of another non-orthogonal sequence set according to an embodiment of the present application.

The terminal superimposes two sequences C1 and C2 to obtain sequence C (that is, the second sequence) with a length of 24. Sequence set A1 includes twelve orthogonal sequences each of which has a length of 24. Sequence set A2 also includes twelve orthogonal sequences each of which has a length of 24. One sequence is selected randomly from sequence set A1. One sequence is selected randomly from sequence set A2. Then the two sequences are superimposed to obtain a sequence with a length of 24. In this case, 144 sequences each of which has a length of 24 may be obtained totally. That is, sequence set B may be obtained. Sequence set B includes 144 sequences each of which has a length of 24. Moreover, sequence set B is a non-orthogonal sequence set. FIG. 1M is a diagram illustrating the generation of another non-orthogonal sequence set according to an embodiment of the present application. As shown in FIG. 1M, it may be considered that sequence C is from sequence set B.

That the terminal generates a reference signal according to obtained sequence C (that is, the second sequence) includes that sequence C is mapped to a time-frequency resource used by a pilot for generating the reference signal, or that designated processing is performed on sequence C, sequence C is mapped to a time-frequency resource used by a pilot for generating the reference signal. The designated processing includes at least one of the following: energy normalization, energy adjustment, power adjustment, amplitude adjustment, phase adjustment, precoding processing, scrambling processing, or the like.

In this embodiment, Table 3 is the set table of another type of sequence set A according to the present application. Sequence set A may be a set including 24 orthogonal Hadamard sequences each of which has a length of 24.

As shown in Table 3, according to the preceding description of this embodiment, sequence set A1 may include the first twelve sequences in sequence set A, and sequence set A2 may include the last twelve sequences in sequence set A. Set B including 144 non-orthogonal sequences each of which has a length of 24 may be constructed according to sequence set A1 and sequence set A2. Moreover, cross-correlation features between sequences in sequence set B are the same as features shown in FIG. 1L.

TABLE 3

Set Table of Another Type of Sequence Set A

| Sequence Index | \multicolumn{24}{c}{Sequence Element Index and Sequence Element} |
|---|---|

| Index | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| 1  | 1 | 1  | 1  | 1  | 1  | 1  | 1  | 1  | 1  | 1  | 1  | 1  | 1  | 1  | 1  | 1  | 1  | 1  | 1  | 1  | 1  | 1  | 1  | 1 |
| 2  | 1 | -1 | 1  | -1 | 1  | -1 | 1  | -1 | -1 | -1 | 1  | -1 | 1  | -1 | 1  | -1 | 1  | 1  | 1  | -1 | -1 | -1 | 1  | -1 |
| 3  | 1 | 1  | -1 | -1 | 1  | 1  | -1 | -1 | 1  | -1 | -1 | 1  | 1  | -1 | -1 | 1  | -1 | 1  | 1  | 1  | -1 | -1 | -1 | 1 |
| 4  | 1 | -1 | -1 | 1  | 1  | -1 | -1 | 1  | 1  | -1 | -1 | 1  | 1  | -1 | -1 | 1  | -1 | 1  | 1  | 1  | -1 | -1 | -1 | 1 |
| 5  | 1 | 1  | 1  | 1  | -1 | -1 | -1 | -1 | 1  | -1 | 1  | -1 | -1 | 1  | -1 | 1  | 1  | -1 | 1  | 1  | 1  | 1  | -1 | -1 |
| 6  | 1 | -1 | 1  | -1 | -1 | 1  | -1 | 1  | 1  | 1  | 1  | -1 | 1  | -1 | -1 | 1  | -1 | 1  | -1 | 1  | 1  | 1  | 1  | -1 |
| 7  | 1 | 1  | -1 | -1 | -1 | -1 | 1  | 1  | 1  | 1  | -1 | -1 | 1  | -1 | -1 | 1  | -1 | 1  | -1 | 1  | -1 | 1  | 1  | 1 |
| 8  | 1 | -1 | -1 | 1  | -1 | 1  | 1  | -1 | 1  | -1 | 1  | 1  | 1  | -1 | 1  | -1 | -1 | 1  | -1 | -1 | 1  | -1 | 1  | 1 |
| 9  | 1 | 1  | 1  | -1 | -1 | -1 | 1  | -1 | -1 | 1  | -1 | 1  | 1  | 1  | 1  | -1 | -1 | -1 | 1  | -1 | -1 | 1  | -1 | 1 |
| 10 | 1 | 1  | 1  | 1  | -1 | -1 | -1 | 1  | -1 | -1 | 1  | -1 | 1  | 1  | 1  | -1 | -1 | -1 | 1  | -1 | -1 | 1  | -1 | 1 |
| 11 | 1 | -1 | 1  | 1  | 1  | -1 | -1 | -1 | 1  | -1 | -1 | 1  | -1 | 1  | -1 | 1  | 1  | -1 | -1 | 1  | -1 | -1 | -1 | 1 |
| 12 | 1 | 1  | -1 | 1  | 1  | 1  | -1 | -1 | -1 | 1  | -1 | -1 | 1  | 1  | -1 | 1  | 1  | 1  | -1 | -1 | -1 | 1  | -1 | -1 |
| 13 | 1 | 1  | 1  | 1  | 1  | 1  | 1  | 1  | 1  | 1  | 1  | 1  | -1 | -1 | -1 | -1 | -1 | -1 | -1 | -1 | -1 | -1 | -1 | -1 |
| 14 | 1 | -1 | 1  | -1 | 1  | 1  | 1  | -1 | -1 | -1 | 1  | -1 | -1 | 1  | -1 | 1  | -1 | -1 | 1  | 1  | 1  | -1 | 1  | 1 |
| 15 | 1 | 1  | -1 | -1 | 1  | -1 | 1  | 1  | -1 | -1 | 1  | 1  | -1 | 1  | 1  | -1 | 1  | -1 | -1 | 1  | 1  | 1  | -1 | 1 |
| 16 | 1 | 1  | -1 | -1 | 1  | -1 | 1  | 1  | 1  | -1 | -1 | -1 | -1 | 1  | -1 | 1  | 1  | -1 | -1 | 1  | -1 | 1  | 1  | 1 |
| 17 | 1 | -1 | 1  | -1 | -1 | 1  | -1 | 1  | 1  | 1  | -1 | -1 | -1 | 1  | -1 | 1  | -1 | 1  | -1 | -1 | -1 | 1  | 1  | 1 |
| 18 | 1 | -1 | -1 | 1  | -1 | -1 | 1  | -1 | 1  | 1  | 1  | -1 | -1 | 1  | -1 | 1  | -1 | 1  | -1 | -1 | -1 | -1 | 1 | 1 |
| 19 | 1 | -1 | 1  | -1 | -1 | 1  | -1 | 1  | -1 | 1  | 1  | 1  | -1 | 1  | -1 | 1  | -1 | 1  | -1 | 1  | -1 | -1 | -1 | -1 |
| 20 | 1 | 1  | -1 | -1 | -1 | 1  | -1 | -1 | 1  | -1 | 1  | -1 | 1  | -1 | 1  | 1  | -1 | 1  | -1 | -1 | 1  | -1 | 1  | -1 |
| 21 | 1 | 1  | 1  | -1 | -1 | -1 | 1  | -1 | -1 | 1  | -1 | 1  | -1 | -1 | 1  | 1  | 1  | -1 | 1  | 1  | -1 | 1  | -1 | -1 |
| 22 | 1 | 1  | 1  | 1  | -1 | -1 | -1 | 1  | -1 | -1 | 1  | -1 | -1 | -1 | -1 | 1  | 1  | 1  | -1 | 1  | 1  | -1 | 1  | 1 |
| 23 | 1 | -1 | 1  | 1  | 1  | -1 | -1 | -1 | 1  | -1 | -1 | 1  | -1 | 1  | -1 | -1 | 1  | 1  | 1  | -1 | 1  | 1  | 1  | -1 |
| 24 | 1 | 1  | -1 | 1  | 1  | 1  | -1 | -1 | -1 | 1  | -1 | -1 | -1 | -1 | 1  | -1 | -1 | -1 | 1  | 1  | 1  | -1 | 1  | 1 |

In this embodiment, Table 4 is the set table of another type of sequence set A according to the present application. Sequence set A may also be a sequence set shown in Table 4. The sequence set also includes 24 orthogonal sequences each of which has a length of 24. Each sequence is sparse. Moreover, the sequence set may be considered a combination of a comb resource structure including three combs and a set including eight orthogonal Hadamard sequences each of which has a length of 8. According to the preceding description of this embodiment, sequence set A1 may include the first twelve sequences in sequence set A, and sequence set A2 may include the last twelve sequences in sequence set A. Set B including 144 non-orthogonal sequences each of which has a length of 24 may be constructed according to sequence set A1 and sequence set A2. Moreover, cross-correlation features between sequences in sequence set B are the same as features shown in FIG. 1L.

TABLE 4

Set Table of Another Type of Sequence Set A

| Sequence Index | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| 1  | 1 | 1  | 1  | 1  | 1  | 1  | 1  | 1  | 0 | 0 | 0 | 0 | 0 | 0 | 0 | 0 | 0 | 0 | 0 | 0 | 0 | 0 | 0 | 0 |
| 2  | 1 | -1 | 1  | -1 | 1  | -1 | 1  | -1 | 0 | 0 | 0 | 0 | 0 | 0 | 0 | 0 | 0 | 0 | 0 | 0 | 0 | 0 | 0 | 0 |
| 3  | 1 | 1  | -1 | -1 | 1  | 1  | -1 | -1 | 0 | 0 | 0 | 0 | 0 | 0 | 0 | 0 | 0 | 0 | 0 | 0 | 0 | 0 | 0 | 0 |
| 4  | 1 | -1 | -1 | 1  | 1  | -1 | -1 | 1  | 0 | 0 | 0 | 0 | 0 | 0 | 0 | 0 | 0 | 0 | 0 | 0 | 0 | 0 | 0 | 0 |
| 5  | 1 | 1  | 1  | 1  | -1 | -1 | -1 | -1 | 0 | 0 | 0 | 0 | 0 | 0 | 0 | 0 | 0 | 0 | 0 | 0 | 0 | 0 | 0 | 0 |
| 6  | 1 | -1 | 1  | -1 | -1 | 1  | -1 | 1  | 0 | 0 | 0 | 0 | 0 | 0 | 0 | 0 | 0 | 0 | 0 | 0 | 0 | 0 | 0 | 0 |
| 7  | 1 | 1  | -1 | -1 | -1 | -1 | 1  | 1  | 0 | 0 | 0 | 0 | 0 | 0 | 0 | 0 | 0 | 0 | 0 | 0 | 0 | 0 | 0 | 0 |
| 8  | 1 | -1 | -1 | 1  | -1 | 1  | 1  | -1 | 0 | 0 | 0 | 0 | 0 | 0 | 0 | 0 | 0 | 0 | 0 | 0 | 0 | 0 | 0 | 0 |
| 9  | 0 | 0  | 0  | 0  | 0  | 0  | 0  | 0  | 1 | 1 | 1 | 1 | 1 | 1 | 1 | 1 | 0 | 0 | 0 | 0 | 0 | 0 | 0 | 0 |
| 10 | 0 | 0  | 0  | 0  | 0  | 0  | 0  | 0  | 1 | -1 | 1 | -1 | 1 | -1 | 1 | -1 | 0 | 0 | 0 | 0 | 0 | 0 | 0 | 0 |
| 11 | 0 | 0  | 0  | 0  | 0  | 0  | 0  | 0  | 1 | 1 | -1 | -1 | 1 | 1 | -1 | -1 | 0 | 0 | 0 | 0 | 0 | 0 | 0 | 0 |
| 12 | 0 | 0  | 0  | 0  | 0  | 0  | 0  | 0  | 1 | -1 | -1 | 1 | 1 | -1 | -1 | 1 | 0 | 0 | 0 | 0 | 0 | 0 | 0 | 0 |
| 13 | 0 | 0  | 0  | 0  | 0  | 0  | 0  | 0  | 1 | 1 | 1 | 1 | -1 | -1 | -1 | -1 | 0 | 0 | 0 | 0 | 0 | 0 | 0 | 0 |
| 14 | 0 | 0  | 0  | 0  | 0  | 0  | 0  | 0  | 1 | -1 | 1 | -1 | -1 | 1 | -1 | 1 | 0 | 0 | 0 | 0 | 0 | 0 | 0 | 0 |
| 15 | 0 | 0  | 0  | 0  | 0  | 0  | 0  | 0  | 1 | 1 | -1 | -1 | -1 | -1 | 1 | 1 | 0 | 0 | 0 | 0 | 0 | 0 | 0 | 0 |
| 16 | 0 | 0  | 0  | 0  | 0  | 0  | 0  | 0  | 1 | -1 | -1 | 1 | -1 | 1 | 1 | -1 | 0 | 0 | 0 | 0 | 0 | 0 | 0 | 0 |
| 17 | 0 | 0  | 0  | 0  | 0  | 0  | 0  | 0  | 0 | 0 | 0 | 0 | 0 | 0 | 0 | 0 | 1 | 1 | 1 | 1 | 1 | 1 | 1 | 1 |
| 18 | 0 | 0  | 0  | 0  | 0  | 0  | 0  | 0  | 0 | 0 | 0 | 0 | 0 | 0 | 0 | 0 | 1 | -1 | 1 | -1 | 1 | -1 | 1 | -1 |
| 19 | 0 | 0  | 0  | 0  | 0  | 0  | 0  | 0  | 0 | 0 | 0 | 0 | 0 | 0 | 0 | 0 | 1 | 1 | -1 | -1 | 1 | 1 | -1 | -1 |
| 20 | 0 | 0  | 0  | 0  | 0  | 0  | 0  | 0  | 0 | 0 | 0 | 0 | 0 | 0 | 0 | 0 | 1 | -1 | -1 | 1 | 1 | -1 | -1 | 1 |
| 21 | 0 | 0  | 0  | 0  | 0  | 0  | 0  | 0  | 0 | 0 | 0 | 0 | 0 | 0 | 0 | 0 | 1 | 1 | 1 | 1 | -1 | -1 | -1 | -1 |
| 22 | 0 | 0  | 0  | 0  | 0  | 0  | 0  | 0  | 0 | 0 | 0 | 0 | 0 | 0 | 0 | 0 | 1 | -1 | 1 | -1 | -1 | 1 | -1 | 1 |
| 23 | 0 | 0  | 0  | 0  | 0  | 0  | 0  | 0  | 0 | 0 | 0 | 0 | 0 | 0 | 0 | 0 | 1 | 1 | -1 | -1 | -1 | -1 | 1 | 1 |
| 24 | 0 | 0  | 0  | 0  | 0  | 0  | 0  | 0  | 0 | 0 | 0 | 0 | 0 | 0 | 0 | 0 | 1 | -1 | -1 | 1 | -1 | 1 | 1 | -1 |

In this embodiment, the arrangement of acquiring multiple sequences and superimposing the sequences helps obtain a non-orthogonal sequence set including a larger number of sequences. Moreover, the non-orthogonal sequence set has sound sequence structure features and cross-correlation features. When multiple UEs use the same time-frequency resource for transmission, the pilot sequence used by each UE is equivalent to being from the non-orthogonal sequence set. That is, the pilot sequences used by multiple UEs are non-orthogonal and have a relatively low collision probability. The receiver may use the non-orthogonal sequence set and its sequence structure features for reception and detection.

Figure 1N:
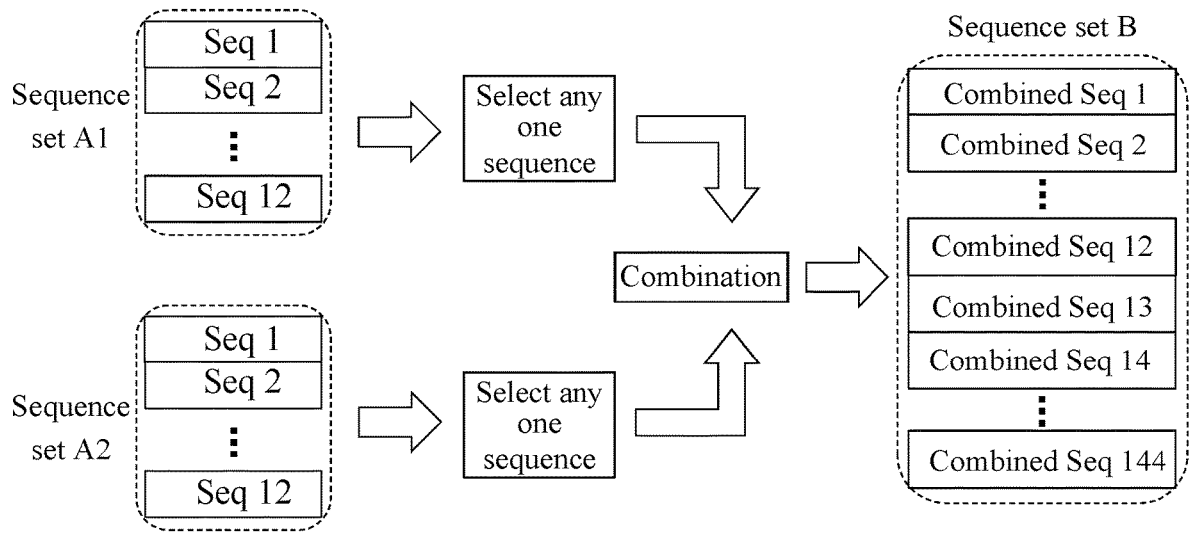
FIG. 1N is a diagram illustrating the generation of another non-orthogonal sequence set according to an embodiment of the present application.

In this embodiment, if the total time-frequency resource overhead occupied by a pilot is 48 REs, any sequence in sequence set A1 and any sequence in sequence set A2 may be combined to obtain sequence set B. Sequence set B includes 144 sequences each of which has a length of 48. Moreover, sequence set B is a non-orthogonal sequence set. FIG. 1N is a diagram illustrating the generation of another non-orthogonal sequence set according to an embodiment of the present application. Referring to FIG. 1N, non-orthogonal sequence set B may be obtained by combining sequence set A1 and sequence set A2.

In this case, sequence set A may be a set including 24 orthogonal Hadamard sequences each of which has a length of 24, as shown in Table 3. Then sequence set A1 may include the first twelve sequences in sequence set A, and sequence set A2 may include the last twelve sequences in sequence set A. Set B including 144 non-orthogonal sequences each of which has a length of 48 may be constructed according to sequence set A1 and sequence set A2. Moreover, cross-correlation features between sequences in sequence set B are the same as features shown in FIG. 1L.

In this case, sequence set A may also be a sequence set shown in Table 4. The sequence set also includes 24 orthogonal sequences each of which has a length of 24. Then sequence set A1 may include the first twelve sequences in sequence set A, and sequence set A2 may include the last twelve sequences in sequence set A. Set B including 144 non-orthogonal sequences each of which has a length of 48 may be constructed according to sequence set A1 and sequence set A2. Moreover, cross-correlation features between sequences in sequence set B are the same as features shown in FIG. 1L.

In an embodiment, it is assumed that the total time-frequency resource overhead occupied by a pilot is 24 REs.

In this embodiment, the terminal (UE) acquires two sequences (that is, first sequences) C1 and C2 first. Sequence C1 is composed of sequence X1 and sequence Y1. Sequence C2 is composed of sequence X2 and sequence Y2. Sequence X1 and sequence X2 are from sequence set X. Sequence Y1 and sequence Y2 are from sequence set Y. For example, sequence set X includes twelve orthogonal sequences each of which has a length of 12, and sequence set Y includes two orthogonal sequences each of which has a length of 2. Moreover, a first sequence in sequence set Y serves as sequence Y1 to be used for acquiring sequence C1, and a second sequence in sequence set Y serves as sequence Y2 to be used for acquiring sequence C2.

In this case, that the terminal acquires two sequences C1 and C2 includes selecting one sequence randomly from sequence set X to serve as sequence X1, acquiring the first sequence Y1 in sequence set Y, and obtaining sequence C1 according to sequence X1 and sequence Y1. Sequence X1 is a sequence with a length of 12 and may represent a 12*1 vector. Sequence Y1 is a sequence with a length of 2 and may represent a 1*2 vector. Matrix multiplication is performed on sequence X1 and sequence Y1 to obtain a 12*2 matrix. The matrix may be converted into a sequence with a length of 24 to serve as sequence C1. Similarly, sequence C2 may be obtained. In this case, sequences C1 and C2 are each a sequence with a length of 24.

In this embodiment, sequence Y1 and sequence Y2 may be referred to as orthogonal cover codes, and sequence set Y may be referred to as an orthogonal cover code set.

It can be seen from the preceding description that new sequence set A1 may be obtained by operating each sequence in sequence set X with the first sequence Y1 in sequence set Y. The sequence set is equivalent to including twelve orthogonal sequences each of which has a length of 24. Similarly, new sequence set A2 may be obtained by operating each sequence in sequence set X with the second sequence Y2 in sequence set Y. The sequence set is also equivalent to including twelve orthogonal sequences each of which has a length of 24. In this case, it may be considered equivalently that sequence C1 is from sequence set A1 and that sequence C2 is from sequence set A2.

In fact, in this embodiment, a sequence with a length of 24 may be obtained by operating any sequence in sequence set X with any sequence in sequence set Y. 24 orthogonal sequences each of which has a length of 24 may be obtained totally. These 24 sequences may form sequence set A. In this case, sequence set A1 and sequence set A2 may be considered to be from sequence set A. Sequence set A1 includes half of the sequences in sequence set A, and sequence set A2 includes the other half of the sequences in sequence set A.

In this embodiment, when the terminal acquires two sequences C1 and C2, one sequence may also be selected randomly from half of the sequences in sequence set X to serve as sequence X1, and one sequence may also be selected randomly from sequence set Y to serve as sequence Y1. Sequence C1 is acquired according to sequence X1 and sequence Y1. Similarly, one sequence is selected randomly from the other half of the sequences in sequence set X to serve as sequence X2, and one sequence is selected randomly from sequence set Y to serve as sequence Y2. Sequence C2 is acquired according to sequence X2 and sequence Y2.

The terminal superimposes two sequences C1 and C2 to obtain sequence C (that is, the second sequence) with a length of 24. Any sequence in sequence set A1 and any sequence in sequence set A2 may be superimposed to obtain sequence set B. Sequence set B includes 144 sequences with a length of 24. Moreover, sequence set B is a non-orthogonal sequence set. In this case, it may be considered that sequence C is from sequence set B.

That the terminal generates a reference signal according to obtained sequence C includes that sequence C is mapped to a time-frequency resource used by a pilot for generating the reference signal, or that designated processing is performed on sequence C, the processed sequence C is mapped to a time-frequency resource used by a pilot for generating the reference signal. The designated processing includes at least one of the following: energy normalization, energy adjustment, power adjustment, amplitude adjustment, phase adjustment, precoding processing, scrambling processing, or the like.

In this embodiment, sequence set X may be a set including twelve orthogonal Hadamard sequences each of which has a length of 12, as shown in Table 1. Alternatively, sequence set X may be a set including twelve orthogonal sequences each of which has a length of 12, as shown in Table 2. Table 5 is a set table of sequence set Y. Sequence set Y is shown in Table 5.

TABLE 5

| Set Table of Sequence Set Y | | |
| --- | --- | --- |
| Sequence Index | Sequence Element Index and Sequence Element | |
| | 1 | 2 |
| 1 | 1 | 1 |
| 2 | 1 | −1 |

According to the preceding description of this embodiment, sequence set A1 and sequence set A2 may each include twelve sequences each of which has a length of 24. In this case, set B including 144 non-orthogonal sequences each of which has a length of 24 may be constructed according to sequence set A1 and sequence set A2. Moreover, cross-correlation features between sequences in sequence set B are the same as features shown in FIG. 1L.

In this embodiment, if the total time-frequency resource overhead occupied by a pilot is 48 REs, any sequence in sequence set A1 and any sequence in sequence set A2 may be combined to obtain sequence set B. Sequence set B includes 144 sequences each of which has a length of 48. Moreover, sequence set B is a non-orthogonal sequence set.

In this case, sequence set X may be a set including twelve orthogonal Hadamard sequences each of which has a length of 12, as shown in Table 1. Alternatively, sequence set X may be a set including twelve orthogonal sequences each of which has a length of 12, as shown in Table 2. Sequence set Y is shown in Table 5. According to the preceding description of this embodiment, equivalent sequence set A1 and equivalent sequence set A2 may be obtained based on sequence set X and sequence set Y. Sequence set A1 and sequence set A2 each include twelve sequences each of which has a length of 24. In this case, set B including 144 non-orthogonal sequences each of which has a length of 48 may be constructed according to sequence set A1 and sequence set A2. Moreover, cross-correlation features between sequences in sequence set B are the same as features shown in FIG. 1L.

In an embodiment, it is assumed that the total time-frequency resource overhead occupied by a pilot is 48 REs.

In this embodiment, the terminal (UE) acquires two sequences (that is, first sequences) first. This includes that the terminal selects two sequences C1 and C2 randomly from sequence set A. Sequence set A includes 24 orthogonal sequences each of which has a length of 24. In this case, sequences C1 and C2 are each a sequence with a length of 24.

The terminal combines two sequences C1 and C2 (for example, in series) to obtain sequence C with a length of 48. Sequence set A includes 24 orthogonal sequences each of which has a length of 24. Two sequences are selected randomly from sequence set A and are combined to obtain a sequence with a length of 48. In this case, 576 sequences each of which has a length of 48 may be obtained totally. That is, sequence set B may be obtained. Sequence set B includes 576 sequences each of which has a length of 48. Moreover, sequence set B is a non-orthogonal sequence set. In this case, it may be considered that sequence C is from sequence set B.

That the terminal generates a reference signal according to obtained sequence C (that is, the second sequence) includes that sequence C is mapped to a time-frequency resource used by a pilot for generating the reference signal, or that designated processing is performed on sequence C, the processed sequence C is mapped to a time-frequency resource used by a pilot for generating the reference signal. The designated processing includes at least one of the following: energy normalization, energy adjustment, power adjustment, amplitude adjustment, phase adjustment, precoding processing, scrambling processing, or the like.

Figure 1O:
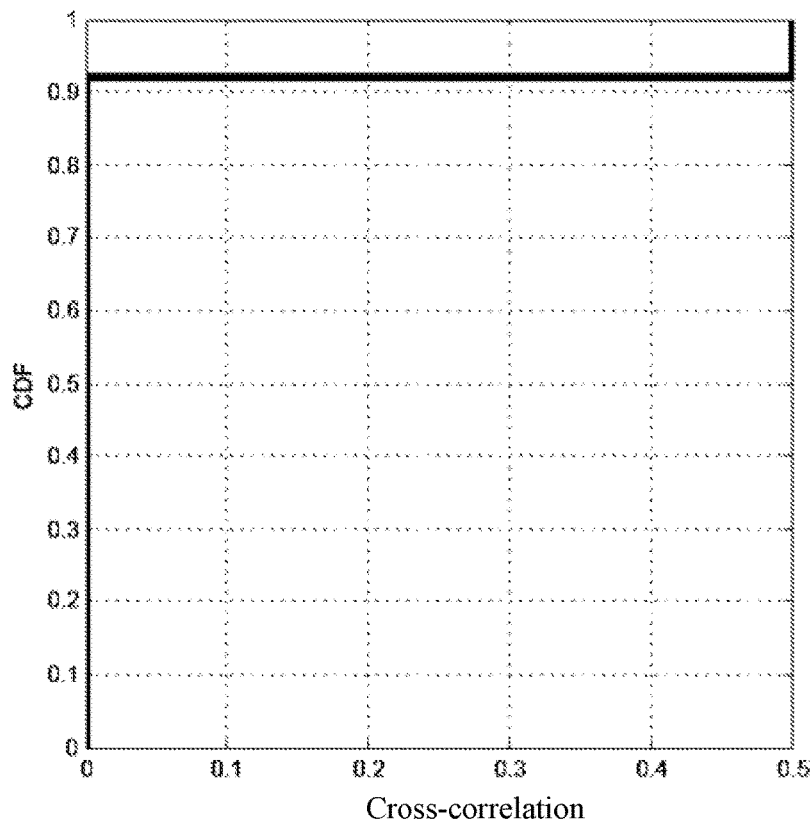
FIG. 1O is a diagram illustrating the CDF distribution of another sequence cross-correlation values according to an embodiment of the present application.

In this embodiment, sequence set A may be a set including 24 orthogonal Hadamard sequences each of which has a length of 24, as shown in Table 3. According to the preceding description of this embodiment, for sequence set A shown in Table 3, set B including 576 non-orthogonal sequences each of which has a length of 48 may be constructed. FIG. 1O is a diagram illustrating the CDF distribution of another sequence cross-correlation values according to an embodiment of the present application. The CDF distribution of the cross-correlation values between sequences is shown in FIG. 1O. It can be seen that 92% of the sequence cross-correlation values and 8% of the sequence cross-correlation values are 0 and 0.5 respectively.

In this embodiment, sequence set A may also be a sequence set shown in Table 4. The sequence set also includes 24 orthogonal sequences each of which has a length of 24. According to the preceding description of this embodiment, for sequence set A shown in Table 4, set B including 576 non-orthogonal sequences each of which has a length of 48 may also be constructed. Moreover, cross-correlation features between sequences in sequence set B are the same as features shown in FIG. 1O.

Other extended embodiments are obtained based on this embodiment and the preceding embodiments, which is not limited here.

In an embodiment, the signal processing method provided in the present application may include the following.

Multiple sequences are acquired (that is, the N first sequences are acquired). The sequences are superimposed or combined to obtain a processed sequence (that is, the second sequence). A reference signal is generated according to the processed sequence. The reference signal is sent.

The sequences represent multiple pilots. Alternatively, the sequences are sequences used by multiple pilots.

The sequences are from one sequence set, and any two of the sequences are allowed to be the same. Alternatively, the sequences are from one sequence set and are different from each other. Alternatively, the sequences are from multiple sequence sets respectively. Alternatively, the sequences are from multiple sequence subsets of one sequence set respectively. Alternatively, the sequences are generated according to a preset rule.

The sequences are selected randomly or generated randomly.

Superimposing the sequences includes the following.

The sequences are superimposed. Alternatively, designated processing is performed on the sequences separately, and the processed sequences are superimposed. Alternatively, the sequences are mapped to different time-frequency resources to implement equivalent superimposition. Alternatively, designated processing is performed on the sequences separately, and the processed sequences are mapped to different time-frequency resources to implement equivalent superimposition.

Combining the sequences includes the following.

The sequences are combined in series. Alternatively, designated processing is performed on the sequences separately, and the processed sequences are combined in series. Alternatively, elements of the sequences are combined in a designated order. Alternatively, designated processing is performed on the sequences separately, elements of the processed sequences are combined in a designated order. The designated order is not limited.

That the reference signal is generated according to the processed sequence includes the following.

Designated processing is further performed on the processed sequence. The further processed sequence is mapped to a designated transmission resource for generating the reference signal.

The designated processing includes at least one of the following: mask processing, scrambling processing, precoding processing, energy normalization, energy adjustment, power adjustment, amplitude adjustment, or phase adjustment.

The energy of each of the sequences is the same. Alternatively, the sequences use different energy levels or energy ratios.

The signal processing method further includes generating data and carrying information in the data. The information includes one or more of the following: the identification information of the sequences or pilots, the energy information of the sequences or pilots, the energy information of one sequence or pilot among the sequences or pilots, the identification information of the processed sequence, the energy information of the processed sequence, the identity identification information of the first communication node, or partial information of the identity identification information of the first communication node.

Figure 2:
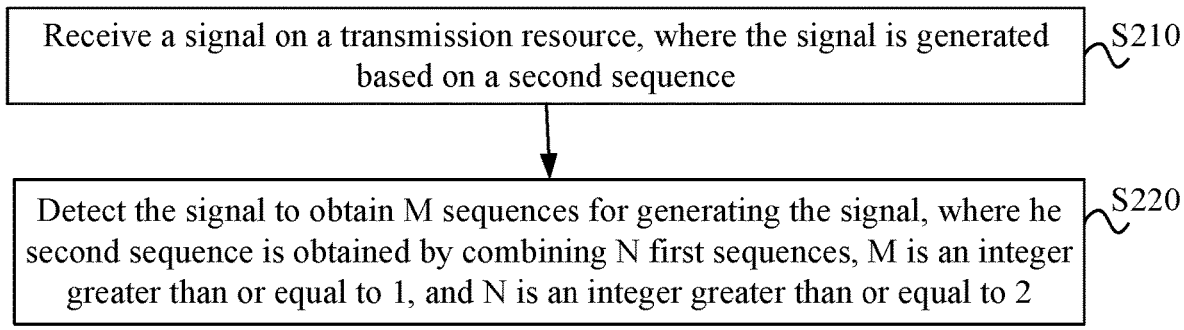
FIG. 2 is a flowchart of another signal processing method according to an embodiment of the present application.

Embodiments of the present application further provide a signal processing method. FIG. 2 is a flowchart of another signal processing method according to an embodiment of the present application. The method may be performed by a signal processing apparatus provided in the present application. The signal processing apparatus may be implemented by software and/or hardware and may be integrated in a second communication node. The second communication node may be a base station.

As shown in FIG. 2, the signal processing method provided in the present application includes S210 and S220.

In S210, a signal is received on a transmission resource. The signal is generated based on a second sequence.

The signal is generated based on the manner shown in FIG. 1. In this application, the signal is received on the transmission resource so that the signal is detected.

In S220, the signal is detected to obtain M sequences for generating the signal. The second sequence is obtained by combining N first sequences. M is an integer greater than or equal to 1. N is an integer greater than or equal to 2.

The S220 of detecting the signal may include that a received pilot symbol is acquired from the transmission resource of the signal and that the acquired pilot symbol is then detected to identify the M sequences used by a first communication node.

For different detection means, the content of the corresponding M sequences is different. Exemplarily, M first sequences may be obtained when the signal is detected based on at least one sequence set to which the first sequences belong. The M sequences may be one second sequence when the signal is detected based on the non-orthogonal sequence set to which the second sequence belongs.

The non-orthogonal sequence set to which the second sequence belongs may be determined based on the at least one sequence set to which the N first sequences belong. For the determination means, refer to the means of determining sequence set B by the first communication node, which is not repeated here.

After the M sequences for generating the signal are obtained, data detection and interference cancellation may be performed based on the M sequences.

The M first sequences may be obtained when the signal is detected based on the at least one sequence set to which the first sequences belong. The size relationship between M and N is not limited here and may be determined based on the number of first communication nodes. For one UE, all the N first sequences used by the UE may be detected. Alternatively, part of the first sequences may be detected. That is, M is less than or equal to N. If multiple UEs exist, first sequences detected and obtained by a receiver include first sequences used by the UEs. That is, M sequences corresponding to each UE may be obtained. In this case, as a whole, the number of first sequences detected and obtained by the receiver may be greater than N. In the case of multiple UEs, the number of sequences detected and obtained by the receiver corresponding to each UE may be different.

The M sequences may be one second sequence when the signal is detected based on the non-orthogonal sequence set to which the second sequence belongs. This is for each UE. If multiple UEs exist, second sequences detected and obtained by the receiver include second sequences used by the UEs. That is, a second sequence corresponding to each UE may be obtained. In this case, as a whole, the receiver may detect and obtain multiple second sequences.

A signal processing method provided in the present application is applied to a second communication node and includes receiving a signal on a transmission resource, where the signal is generated based on a second sequence; and detecting the signal to obtain M sequences for generating the signal, where the second sequence is obtained by combining N first sequences, M is an integer greater than or equal to 1, and N is an integer greater than or equal to 2. According to the method, reception and detection are performed with regard to features of multiple pilots or non-orthogonal pilots, thereby achieving better transmission performance.

Based on the preceding embodiment, extended embodiments of the preceding embodiment are provided. For the brevity of description, only differences from the preceding embodiment are described in the extended embodiments.

In an embodiment, that the signal is detected to obtain the M sequences for generating the signal includes the following.

The signal is detected based on at least one sequence set to which the N first sequences belong so as to obtain the M sequences for generating the signal. The M sequences include M first sequences.

The second communication node may pre-store the at least one sequence set to which the N first sequences belong. When the signal is detected, blind detection may be performed on the signal based on the at least one sequence set to which the N first sequences belong. The first communication node and the second communication node may pre-determine a manner of acquiring the first sequences so that the second communication node can detect the signal based on the at least one sequence set to which the N first sequences belong.

In an embodiment, that the signal is detected to obtain the M sequences for generating the signal includes the following.

The signal is detected based on the non-orthogonal sequence set to which the second sequence belongs so as to obtain the M sequences for generating the signal. The M sequences include one second sequence. The non-orthogonal sequence set is determined based on the at least one sequence set to which the N first sequences belong.

The second communication node may perform blind detection on the signal based on the non-orthogonal sequence set to which the second sequence belongs so as to obtain one second sequence. For the means of determining the non-orthogonal sequence set, refer to the means of determining sequence set B by the first communication node, which is not repeated here.

In an embodiment, this method further includes the following.

A data symbol is acquired. The data symbol is detected based on the M sequences for generating the signal to acquire a detection result.

In the present application, channel estimation may be performed based on the M sequences so as to receive and detect the received data symbol.

In an embodiment, the method further includes acquiring information from the detection result. The information includes one or more of the following: the identification information of the N first sequences, the energy information of at least one first sequence among the N first sequences, the identification information of the second sequence, the energy information of the second sequence, or the identity identification information of the first communication node.

An exemplary description of the present application is made below. In an embodiment, at the receiving end, the receiver acquires a received pilot symbol from a reference signal transmission resource first and then detects the acquired pilot symbol to identify multiple pilot sequences (that is, all or part of the N first sequences) used by a transmitter.

As described in the preceding embodiments, for the reference signal generation method in which multiple pilots use different time-frequency resources, an example is taken in which two pilots are used. The receiver detects pilot P1 to identify a pilot sequence used by the transmitter on pilot P1, performs channel estimation, and then detects a received data symbol. The receiver also detects pilot P2 to identify a pilot sequence used by the transmitter on pilot P2, performs channel estimation, and then detects a received data symbol. The receiver may perform the detection process on pilot P1 and the detection process on pilot P2 in parallel or in series. In an embodiment, reception and detection may be performed in combination with interference cancellation. When the processes are performed in parallel, the same UE may be detected and decoded successfully through any one of pilot P1 and pilot P2. In this case, any correct decoding result of the UE may be reserved. Moreover, interference cancellation is performed on a pilot symbol of the UE and a data symbol of the UE. Then the next round of iterative detection is performed. That is, a receiving symbol updated after interference cancellation is re-received and re-detected through pilot P1 and pilot P2. When the processes are performed in series, if one UE is detected and decoded successfully through pilot P1, reconstruction and interference cancellation may be performed on the pilot symbol and the data symbol of the UE. Then reception, detection, and interference cancellation are performed on other UEs through pilot P2. Then the next round of iterative detection starts. That is, reception and detection are performed again through pilot P1 and pilot P2 successively. Iterations are performed in this manner until no user can be identified or detected or until the designated number of iterations is reached.

For contention-based grant-free transmission, because the information about an access UE is not known, the identity identification information of the first communication node, such as UE identifier (ID) information or partial information of the UE ID, may be carried in data payload. In this case, when the data of one UE is detected and decoded successfully, it is known the data of which UE is received successfully. Additionally, to guarantee the identification and detection performance of other UEs, interference cancellation also needs to be performed on a pilot symbol. Because each transmitter uses multiple independent or random pilots, the receiver does not know the information of the pilots used by each UE transmitter. The information of the pilots may be carried in data payload, including the energy information of each pilot and identification information used for pilot identification, for example, pilot composition information or pilot index information.

Interference cancellation may be performed by using a channel estimation result obtained based on pilots. However, considering that pilots of multiple UEs may collide with each other, in order to improve the performance of contention-based grant-free transmission, channel estimation may be performed based on the algorithm of least squares by using reconstructed sending symbols of all correctly decoded users so that an updated channel estimation result is obtained. Interference cancellation is performed based on the updated channel estimation result.

For the reference signal generation method in which multiple pilots use the same time-frequency resource, an example is taken in which two pilots are used. If two pilots of one UE are from different sets, the processing of the receiver may be similar to the processing described above. If two pilots of one UE are from the same set, the receiver may identify the two pilots of the UE simultaneously when detecting received pilot symbols, thereby unable to distinguish pilot P1 from pilot P2. In this case, the processing of the receiver is actually similar to the processing of a receiver in a traditional solution. The difference lies in that one UE uses two pilots in this solution. Although pilots of different UEs may collide with each other, the collision probability is reduced. The receiver may detect and identify more pilots. The arrangement in which the receiver receives and detects a data symbol based on these pilots helps achieve better transmission performance.

In an embodiment, the M sequences obtained by detecting the signal may be one second sequence, that is, a joint pilot sequence.

At the receiving end, the receiver acquires a received pilot symbol from a reference signal transmission resource first and then detects the acquired pilot symbol to identify the joint pilot sequence used by a transmitter.

The receiver may construct non-orthogonal sequence set B in a similar manner to a transmitter. The receiver uses each sequence in sequence set B to perform blind detection on an acquired pilot symbol, identifies a joint pilot sequence used by a transmitter, and then detects a received data symbol according to the identified joint pilot sequence.

When joint pilot identification or user identification is performed, constructed non-orthogonal pilot sequence set B is used for blind detection. Through correlation detection, each joint pilot sequence with a correlation value greater than a designated threshold and/or several joint pilot sequences with larger correlation values are acquired to serve as identified joint pilot sequences.

The receiver may use each identified joint pilot sequence to perform channel estimation based on the algorithm of least squares so that a channel estimation result is obtained to be used for receiving and detecting a received data symbol.

A joint pilot sequence is obtained by combining or superimposing multiple component sequences. The component sequences may be each from an orthogonal component sequence set or a non-orthogonal component sequence set. In this case, the receiver may determine corresponding component sequences or composition sequences according to an identified joint pilot sequence. For example, multiple component sequences forming the joint pilot sequence are determined through a division operation or a remainder operation according to the index of the joint pilot sequence and the size of a component sequence set. The receiver may also directly use a component sequence set to detect and identify multiple component sequences used by a transmitter for forming a joint pilot sequence. In an embodiment, the receiver may use multiple determined component sequences used by a transmitter to perform channel estimation, which is used for receiving and detecting a received data symbol.

For contention-based grant-free transmission, the receiver may use the interference cancellation technology to reconstruct a sending symbol of a correctly decoded user, perform interference cancellation, and then continue to detect other users. Iterations are performed in this manner until no user can be identified or detected or until the designated number of iterations is reached. The receiver may determine, according to a decoded cyclic redundancy check (CRC) result, whether the decoding is correct.

Because the information about an access UE is not known, the part of data payload may carry UE ID information or partial information of the UE ID. After decoding data correctly, the receiver obtains the ID of the UE and the data transmitted by the UE. To guarantee the identification and detection performance of other UEs, interference cancellation also needs to be performed on a pilot symbol. Because the pilot used by each UE transmitter is not known, the information of a joint pilot sequence (that is, the identification information of the second sequence) or the information of multiple component sequences (that is, the identification information of the N first sequences) may be carried in data payload, including sequence energy information and identification information used for sequence identification, for example, sequence composition information or sequence index information.

For a channel estimation value used in interference cancellation, considering that the joint pilot sequences are non-orthogonal and that pilots of multiple UEs may collide with each other, in order to improve the performance of contention-based grant-free transmission, channel estimation may be performed based on the algorithm of least squares by using reconstructed sending symbols of all correctly decoded users so that an updated channel estimation result is obtained. Interference cancellation is performed based on the updated channel estimation result.

In this embodiment, when contention-based grant-free transmission is performed on multiple UEs, pilot sequences used by the UEs are from a non-orthogonal sequence set including a larger number of sequences. Moreover, the non-orthogonal sequence set has sound sequence structure features and cross-correlation features. The pilot sequences used by the UEs are non-orthogonal and have a relatively low collision probability. The arrangement in which the receiver performs reception and detection by using the non-orthogonal sequence set and the sequence structure features of the non-orthogonal sequence set helps achieve better transmission performance.

In an embodiment, the signal processing method may include the following.

A symbol is acquired on a transmission resource. The acquired symbol is detected to obtain M sequences used by a first communication node. The symbol is a symbol sent by the first communication node, received by a second communication node, and generated based on a second sequence. The second sequence is obtained by combining N first sequences. M is an integer greater than or equal to 1. N is an integer greater than or equal to 2.

Figure 3:
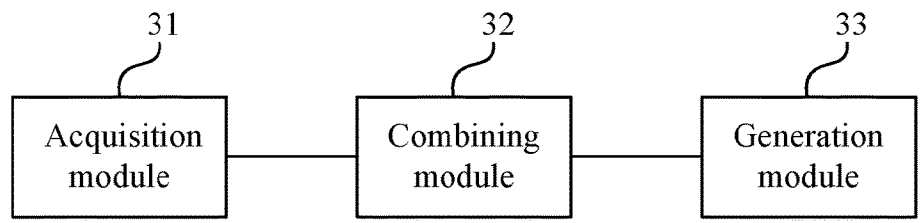
FIG. 3 is a diagram illustrating the structure of a signal processing apparatus according to an embodiment of the present application.

The present application provides a signal processing apparatus. FIG. 3 is a diagram illustrating the structure of a signal processing apparatus according to an embodiment of the present application. The signal processing apparatus may be configured in the first communication node. As shown in FIG. 3, the signal processing apparatus includes an acquisition module 31, a combining module 32, and a generation module 33. The acquisition module 31 is configured to acquire N first sequences. The combining module 32 is configured to combine the N first sequences to obtain a second sequence. The generation module 33 is configured to generate a signal according to the second sequence. N is an integer greater than or equal to 2.

The signal processing apparatus provided in this embodiment is configured to perform the signal processing method of the embodiment shown in FIG. 1. The signal processing apparatus provided in this embodiment has similar implementation principles and effects to the signal processing method of the embodiment shown in FIG. 1, which is not repeated here.

Based on the preceding embodiment, extended embodiments of the preceding embodiment are provided. For the brevity of description, only differences from the preceding embodiment are described in the extended embodiments.

In an embodiment, the combining module 32 is specifically configured to perform the following.

The N first sequences are superimposed. Alternatively, designated processing is performed on the N first sequences separately, and the processed N first sequences are superimposed.

In an embodiment, the combining module 32 is specifically configured to perform the following.

The N first sequences are combined in series. Alternatively, designated processing is performed on the N first sequences separately, and the processed N first sequences are combined in series.

In an embodiment, the combining module 32 is specifically configured to perform the following.

The N first sequences are mapped to different time-frequency resources. Alternatively, designated processing is performed on the N first sequences separately, and the processed N first sequences are mapped to different time-frequency resources.

In an embodiment, the generation module 33 is specifically configured to perform the following.

Designated processing is performed on the second sequence, and the processed second sequence is mapped to a time-frequency resource, and the signal is generated.

In an embodiment, the designated processing includes one or more of the following: mask processing, scrambling processing, precoding processing, energy adjustment, power adjustment, amplitude adjustment, or phase adjustment.

In an embodiment, the second sequence is one sequence in a non-orthogonal sequence set. The second sequence corresponds to one pilot.

In an embodiment, one first sequence corresponds to one pilot.

In an embodiment, the acquisition module 31 is specifically configured to perform one of the following.

The N first sequences are acquired from one sequence set. Any two sequences among the N first sequences are different, or T sequences among the N first sequences are the same. T is an integer greater than or equal to 2 and is less than or equal to N. Alternatively, the N first sequences are acquired from different sequence sets. Alternatively, the N first sequences are acquired from different subsets of the same sequence set.

In an embodiment, a sequence set includes one or more of the following: a Hadamard sequence set, a sequence set obtained according to a Hadamard sequence set, a ZC sequence set, or a four-phase sequence set.

In an embodiment, the N first sequences are acquired randomly.

In an embodiment, the apparatus further includes a data generation module. The data generation module is configured to generate data and carry information in the data. The information includes one or more of the following: the identification information of the N first sequences, the energy information of at least one first sequence among the N first sequences, the identification information of the second sequence, the energy information of the second sequence, or the identity identification information of the first communication node.

Figure 4:
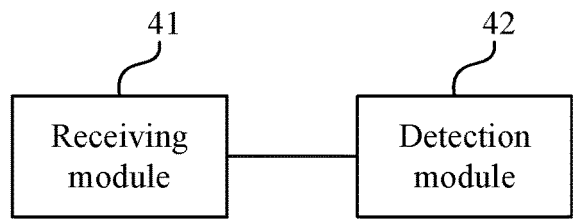
FIG. 4 is a diagram illustrating the structure of another signal processing apparatus according to an embodiment of the present application.

The present application further provides a signal processing apparatus. FIG. 4 is a diagram illustrating the structure of another signal processing apparatus according to an embodiment of the present application. The signal processing apparatus may be configured in a second communication node. As shown in FIG. 4, the signal processing apparatus includes a receiving module 41 and a detection module 42. The receiving module 41 is configured to receive a signal on a transmission resource. The signal is generated based on a second sequence. The detection module 42 is configured to detect the signal to obtain M sequences for generating the signal. The second sequence is obtained by combining N first sequences. M is an integer greater than or equal to 1. N is an integer greater than or equal to 2.

The signal processing apparatus provided in this embodiment is configured to perform the signal processing method of the embodiment shown in FIG. 2. The signal processing apparatus provided in this embodiment has similar implementation principles and effects to the signal processing method of the embodiment shown in FIG. 2, which is not repeated here.

Based on the preceding embodiment, extended embodiments of the preceding embodiment are provided. For the brevity of description, only differences from the preceding embodiment are described in the extended embodiments.

In an embodiment, the detection module 42 is specifically configured to perform the following.

The signal is detected based on at least one sequence set to which the N first sequences belong so as to obtain the M sequences for generating the signal. The M sequences include M first sequences.

In an embodiment, the detection module 42 is specifically configured to perform the following.

The signal is detected based on the non-orthogonal sequence set to which the second sequence belongs so as to obtain the M sequences for generating the signal. The M sequences include one second sequence. The non-orthogonal sequence set is determined based on the at least one sequence set to which the N first sequences belong.

In an embodiment, the apparatus further includes a data acquisition module. The data acquisition module is configured to perform the following.

A data symbol is acquired. The data symbol is detected based on the M sequences for generating the signal to acquire a detection result.

Figure 5:
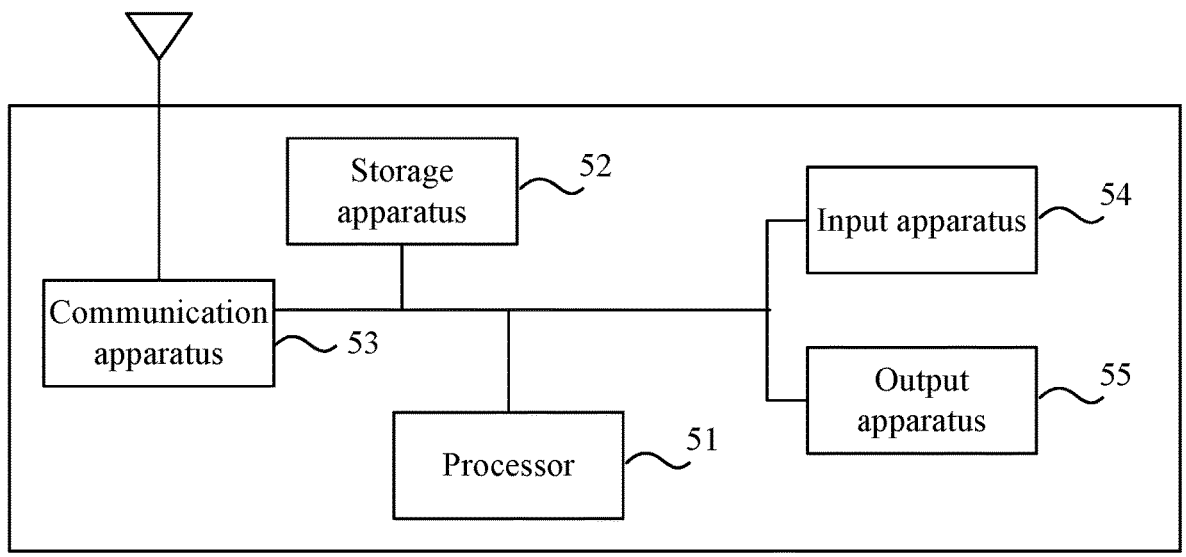
FIG. 5 is a diagram illustrating the structure of a first communication node according to an embodiment of the present application.

In an embodiment, the apparatus further includes an information acquisition module. The information acquisition module is configured to acquire information from the detection result. The information includes one or more of the following: the identification information of the N first sequences, the energy information of at least one first sequence among the N first sequences, the identification information of the second sequence, the energy information of the second sequence, or the identity identification information of the first communication node. The present application provides a first communication node. FIG. 5 is a diagram illustrating the structure of a first communication node according to an embodiment of the present application. As shown in FIG. 5, the first communication node provided in the present application includes one or more processors 51 and a storage apparatus 52. One or more processors 51 may be provided in the first communication node. In FIG. 5, one processor 51 is taken as an example. When executed by the one or more processors 51, the one or more programs cause the one or more processors 51 to perform the method shown in FIG. 1 in embodiments of the present application.

The first communication node further includes a communication apparatus 53, an input apparatus 54, and an output apparatus 55.

The processor 51, the storage apparatus 52, the communication apparatus 53, the input apparatus 54, and the output apparatus 55 in the first communication node may be connected via a bus or other means, with connection via a bus as an example in FIG. 5.

The input apparatus 54 may be configured to receive input digital or character information and to generate key signal input related to user settings and function control of the first communication node. The output apparatus 55 may include a display device, for example, a display screen.

The communication apparatus 53 may include a receiver and a transmitter. The communication apparatus 53 is configured to perform information transceiving and communication under the control of the one or more processors 51. The information includes but is not limited to a signal and data.

As a computer-readable storage medium, the storage apparatus 52 may be configured to store software programs, computer-executable programs and modules, such as program instructions/modules (for example, the acquisition module 31, the combining module 32 and the generation module 42 in the signal processing apparatus) corresponding to the method shown in FIG. 1 in embodiments of the present application. The storage apparatus 52 may include a program storage area and a data storage area. The program storage area may store an operating system and an application program required by at least one function. The data storage area may store data created depending on use of the first communication node. Additionally, the storage apparatus 52 may include a high-speed random-access memory and may further include a nonvolatile memory, such as at least one disk memory, a flash memory, or another nonvolatile solid-state memory. In some examples, the storage apparatus 52 may include memories which are remotely disposed with respect to the processor 51. These remote memories may be connected to the first communication node via a network. Examples of the preceding network include, but are not limited to, the Internet, an intranet, a local area network, a mobile communication network, and a combination thereof.

Figure 6:
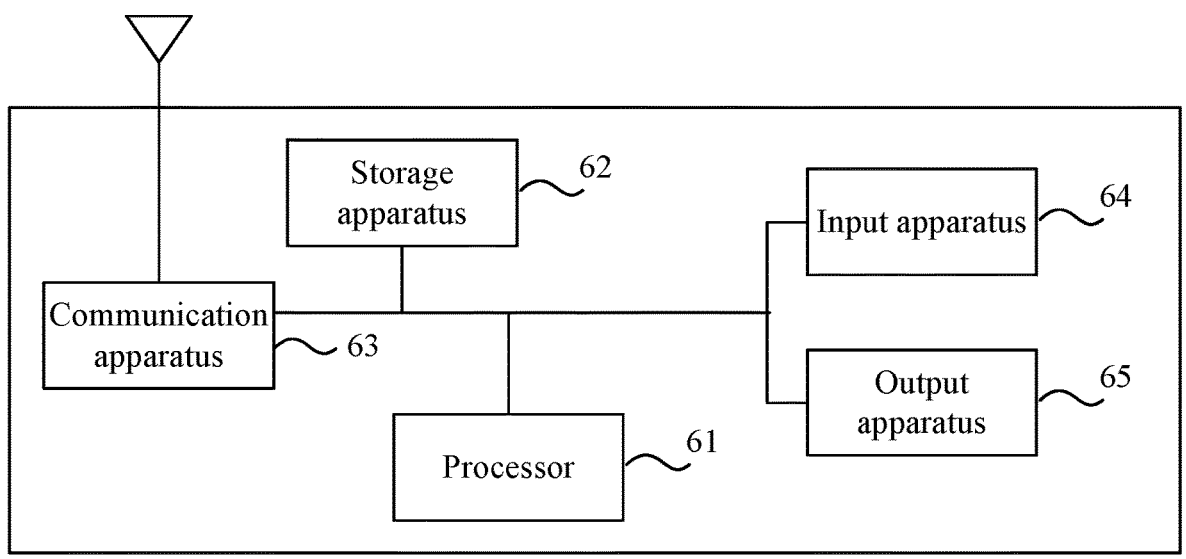
FIG. 6 is a diagram illustrating the structure of a second communication node according to an embodiment of the present application.

Embodiments of the present application further provide a second communication node. FIG. 6 is a diagram illustrating the structure of a second communication node according to an embodiment of the present application. As shown in FIG. 6, the second communication node provided in the present application includes one or more processors 61 and a storage apparatus 62. One or more processors 61 are provided in the second communication node. In FIG. 6, one processor 61 is taken as an example. The storage apparatus 62 is configured to store one or more programs. When executed by the one or more processors 61, the one or more programs cause the one or more processors 61 to perform the method shown in FIG. 2 in embodiments of the present application.

The second communication node further includes a communication apparatus 63, an input apparatus 64, and an output apparatus 65.

The processor 61, the storage apparatus 62, the communication apparatus 63, the input apparatus 64, and the output apparatus 65 in the second communication node may be connected via a bus or other means, with connection via a bus as an example in FIG. 6.

The input apparatus 64 may be configured to receive input digital or character information and to generate key signal input related to user settings and function control of the second communication node. The output apparatus 65 may include a display device, for example, a display screen.

The communication apparatus 63 may include a receiver and a transmitter. The communication apparatus 63 is configured to perform information transceiving and communication under the control of the one or more processors 61.

As a computer-readable storage medium, the storage apparatus 62 may be configured to store software programs, computer-executable programs and modules, such as program instructions/modules (for example, the receiving module 41 and the detection module 42 in the signal processing apparatus) corresponding to the signal processing method shown in FIG. 2 in embodiments of the present application. The storage apparatus 62 may include a program storage area and a data storage area. The program storage area may store an operating system and an application program required by at least one function. The data storage area may store data created depending on use of the second communication node. Additionally, the storage apparatus 62 may include a high-speed random-access memory and may further include a nonvolatile memory, such as at least one disk memory, a flash memory, or another nonvolatile solid-state memory. In some examples, the storage apparatus 62 may include memories which are remotely disposed with respect to the processor 61. These remote memories may be connected to the second communication node via a network. Examples of the preceding network include, but are not limited to, the Internet, an intranet, a local area network, a mobile communication network, and a combination thereof.

Embodiments of the present application further provide a storage medium storing a computer program. When the computer program is executed by a processor, any signal processing method described in embodiments of the present application is performed, for example, the signal processing method applied to a first communication node and the signal processing method applied to a second communication node. The signal processing method applied to the first communication node includes acquiring N first sequences, combining the N first sequences to obtain a second sequence, and generating a signal according to the second sequence. N is an integer greater than or equal to 2.

The signal processing method applied to the second communication node includes receiving a signal on a transmission resource, where the signal is generated based on a second sequence; and detecting the signal to obtain M sequences for generating the signal, where the second sequence is obtained by combining N first sequences, M is an integer greater than or equal to 1, and N is an integer greater than or equal to 2.

The computer storage medium in embodiments of the present application may use any combination of one or more computer-readable media. A computer-readable medium may be a computer-readable signal medium or a computer-readable storage medium. The computer-readable storage medium may be, but is not limited to, an electrical, magnetic, optical, electromagnetic, infrared, or semiconductor system, apparatus, or element, or any combination thereof. The computer-readable storage medium includes (a non-exhaustive list): an electrical connection having one or more wires, a portable computer disk, a hard disk, a random access memory (RAM), a read-only memory (ROM), an erasable programmable read only memory (EPROM), a flash memory, an optical fiber, a portable compact disk read-only memory (CD-ROM), an optical memory component, a magnetic memory component, or any appropriate combination thereof. The computer-readable storage medium may be any tangible medium including or storing a program. The program may be used by or used in conjunction with an instruction execution system, apparatus, or element.

The computer-readable signal medium may include a data signal propagated in a baseband or as part of a carrier. The data signal carries computer-readable program codes. The data signal propagated in this manner may be in multiple forms and includes, and is not limited to, an electromagnetic signal, an optical signal, or any suitable combination thereof. The computer-readable signal medium may further be any computer-readable medium other than the computer-readable storage medium. The computer-readable medium may send, propagate, or transmit the program used by or used in conjunction with the instruction execution system, apparatus, or element.

The program codes included on the computer-readable medium may be transmitted on any suitable medium including, but not limited to, a wireless medium, a wire, an optical cable, a radio frequency (RF) and the like or transmitted on any suitable combination thereof.

Computer program codes for performing the operations of the present application may be written in one or more programming languages or combination thereof, including object-oriented programming languages such as Java, Smalltalk, C++, as well as conventional procedural programming languages such as "C" or similar programming languages. The program codes may be executed entirely on a user computer, partly on the user computer, as a stand-alone software package, partly on the user computer and partly on a remote computer, or entirely on the remote computer or a server. In the case relating to the remote computer, the remote computer may be connected to the user computer via any kind of network including a local area network (LAN) or a wide area network (WAN), or may be connected to an external computer (for example, via the Internet through an Internet service provider).

The above are only exemplary embodiments of the present application and are not intended to limit the scope of the present application.

The term user equipment encompasses any suitable type of wireless user equipment, such as a mobile phone, a portable data processing apparatus, a portable web browser, or an onboard mobile station.

In general, multiple embodiments of the present application may be implemented in hardware or dedicated circuits, software, logics, or any combination thereof. For example, some aspects may be implemented in hardware while other aspects may be implemented in firmware or software that may be executed by a controller, a microprocessor, or another computing apparatus, though the present application is not limited thereto.

The embodiments of the present application may be implemented by computer program instructions executed by a data processor of a mobile apparatus, for example, in a processor entity, by hardware, or by a combination of software and hardware. The computer program instructions may be assembly instructions, instruction set architecture (ISA) instructions, machine instructions, machine-related instructions, microcodes, firmware instructions, status setting data, or source or object codes written in any combination of one or more programming languages.

A block diagram of any logic flow among the drawings of the present application may represent program procedures, may represent interconnected logic circuits, modules and functions, or may represent a combination of program procedures with logic circuits, modules, and functions. Computer programs may be stored in the memory. The memory may be of any type suitable for the local environment and may be implemented by using any suitable data storage technology, such as, but not limited to, a ROM, a RAM, an optical storage apparatus and system (a digital video disc (DVD) or a CD), and the like. The computer-readable medium may include a non-transitory storage medium. The data processor may be of any type suitable for the local environment such as, but not limited to, a general-purpose computer, a special-purpose computer, a microprocessor, a digital signal processor (DSP), an application-specific integrated circuit (ASIC), a field-programmable gate array (FPGA) and a processor based on a multi-core processor architecture.

What is claimed is:

1. A signal processing method, applied to a first communication node, comprising:
   acquiring N first sequences, wherein the N first sequences are acquired randomly;
   combining the N first sequences to obtain a second sequence;
   generating a signal according to the second sequence;
   generating data and carrying information in the data, wherein the information comprises at least one of the following: identification information of the N first sequences, energy information of at least one first sequence among the N first sequences, identification information of the second sequence, or energy information of the second sequence; and
   transmitting the signal and the data on a transmission resource to a second communication node,
   wherein N is an integer greater than or equal to 2, and the signal comprises a reference signal or a random access signal.

2. The method according to claim 1, wherein combining the N first sequences comprises:
   superimposing the N first sequences; or
   performing designated processing on the N first sequences separately, and superimposing the processed N first sequences.

3. The method according to claim 1, wherein combining the N first sequences comprises:
   combining the N first sequences in series; or
   performing designated processing on the N first sequences separately, and combining the processed N first sequences in series.

4. The method according to claim 1, wherein combining the N first sequences comprises:
   mapping the N first sequences to different time-frequency resources; or
   performing designated processing on the N first sequences separately, and mapping the processed N first sequences to different time-frequency resources.

5. The method according to claim 1, wherein generating the signal according to the second sequence comprises:
   performing designated processing on the second sequence, mapping the processed second sequence to a time-frequency resource and generating the signal.

6. The method according to claim 2, wherein the designated processing comprises at least one of the following:
   mask processing, scrambling processing, precoding processing, energy adjustment, power adjustment, amplitude adjustment, or phase adjustment.

7. The method according to claim 1, wherein the second sequence is one sequence in a non-orthogonal sequence set, and the second sequence corresponds to one pilot.

8. The method according to claim 1, wherein one first sequence among the N first sequences corresponds to one pilot.

9. The method according to claim 1, wherein acquiring the N first sequences comprises one of the following:
   acquiring the N first sequences from one sequence set, wherein any two sequences among the N first sequences are different, or T sequences among the N first sequences are the same, wherein T is an integer greater than or equal to 2 and is less than or equal to N;
   acquiring the N first sequences from different sequence sets; or
   acquiring the N first sequences from different subsets of a same sequence set.

10. The method according to claim 9, wherein a sequence set comprises at least one of the following: a Hadamard sequence set, a sequence set obtained according to a Hadamard sequence set, a Zadoff-Chu (ZC) sequence set, or a four-phase sequence set.

11. The method according to claim 1,
    wherein the information further comprises
    identity identification information of the first communication node.

12. A signal processing method, applied to a second communication node, comprising:
    receiving a signal and acquiring a data symbol on a transmission resource transmitted by a first communication node, wherein the signal is generated based on a second sequence, and the signal comprises a reference signal or a random access signal;
    detecting the signal to obtain M sequences for generating the signal,
    wherein the second sequence is obtained by combining N first sequences, the N first sequences are acquired randomly, M is an integer greater than or equal to 1, and N is an integer greater than or equal to 2;
    detecting the data symbol based on the M sequences for generating the signal to acquire a detection result; and acquiring information from the detection result, wherein the information comprises at least one of the following: identification information of the N first sequences, energy information of at least one first sequence among the N first sequences, identification information of the second sequence, or energy information of the second sequence.

13. The method according to claim 12, wherein detecting the signal to obtain the M sequences for generating the signal comprises:

detecting the signal based on at least one sequence set to which the N first sequences belong to obtain the M sequences for generating the signal, wherein the M sequences comprise M first sequences.

14. The method according to claim 12, wherein detecting the signal to obtain the M sequences for generating the signal comprises:

detecting the signal based on a non-orthogonal sequence set to which the second sequence belongs to obtain the M sequences for generating the signal, wherein the M sequences comprise one second sequence, and the non-orthogonal sequence set is determined based on at least one sequence set to which the N first sequences belong.

15. The method according to claim 12, wherein the information further comprises identity identification information of a first communication node.

16. A first communication node, comprising:
at least one processor; and
a storage apparatus configured to store at least one program,
wherein when executed by the at least one processor, the at least one program causes the at least one processor to perform the signal processing method according to claim 1.

17. A second communication node, comprising:
at least one processor; and
a storage apparatus configured to store at least one program,
wherein when executed by the at least one processor, the at least one program causes the at least one processor to perform the signal processing method according to claim 12.

18. A non-transitory storage medium storing a computer program, wherein the computer program is configured to, when executed by a processor, implement the signal processing method according to claim 1.

* * * * *